(12) United States Patent
Ishida

(10) Patent No.: US 9,646,334 B2
(45) Date of Patent: May 9, 2017

(54) VEHICLE EVALUATION DEVICE AND VEHICLE EVALUATION METHOD

(71) Applicant: Hitoshi Ishida, Tokyo (JP)

(72) Inventor: Hitoshi Ishida, Tokyo (JP)

(*) Notice: Subject to any disclaimer, the term of this patent is extended or adjusted under 35 U.S.C. 154(b) by 0 days.

(21) Appl. No.: 13/754,194

(22) Filed: Jan. 30, 2013

(65) Prior Publication Data

US 2014/0249959 A1 Sep. 4, 2014

Related U.S. Application Data

(63) Continuation of application No. PCT/JP2011/068021, filed on Aug. 8, 2011.

(30) Foreign Application Priority Data

Aug. 6, 2010 (JP) ................................. 2010-177544

(51) Int. Cl.
*G06Q 30/06* (2012.01)
*G06Q 30/02* (2012.01)

(52) U.S. Cl.
CPC ..... *G06Q 30/0623* (2013.01); *G06Q 30/0282* (2013.01); *G06Q 30/0283* (2013.01)

(58) Field of Classification Search
CPC ......... G06Q 30/00; G06Q 30/06; G07C 5/008
USPC ....................................... 705/26.1; 701/29.1
See application file for complete search history.

(56) References Cited

U.S. PATENT DOCUMENTS

| 8,155,868 B1* | 4/2012 | Xing ................... G07C 5/0808 340/439 |
| 2005/0021191 A1 | 1/2005 | Taniguchi et al. |
| 2005/0143876 A1 | 6/2005 | Tanase |
| 2010/0325049 A1* | 12/2010 | Tanaka ................... G06Q 10/06 705/44 |
| 2011/0000726 A1 | 1/2011 | Tanaka |

FOREIGN PATENT DOCUMENTS

| JP | 2003-303303 A | 10/2003 |
| JP | 2005-016443 A | 1/2005 |
| JP | 2005-030369 A | 2/2005 |
| JP | 2006-197765 A | 7/2006 |
| JP | 2007-064091 A | 3/2007 |
| JP | 2009-063555 A | 3/2009 |
| JP | 2009-087317 A | 4/2009 |
| JP | 2010-001005 A | 1/2010 |
| JP | 2010-149586 A | 7/2010 |

* cited by examiner

*Primary Examiner* — Mila Airapetian
(74) *Attorney, Agent, or Firm* — Rabin & Berdo, P.C.

(57) ABSTRACT

Various forms of vehicle driving energy are provided for vehicles, such as gasoline vehicle, hybrid vehicle, ethanol vehicle, electric vehicle and fuel cell vehicle. In such circumstances, an index is desired by vehicle purchasers, which has a viewpoint on the benefit to be obtained by using an electricity storing section of a vehicle for other than running the vehicle, and with which the economic efficiencies of those vehicles can be more clearly compared/examined, in the correlation between the prices of the abovementioned vehicles using various vehicle drive energy modes, and the fuel consumption and the drive energy consumption costs thereof. To display evaluations of vehicles in various drive energy modes, by dividing a fuel efficiency numerical value by a vehicle price. In addition, to achieve a vehicle evaluation/comparison at the time of purchasing a new car, by setting a planned running distance.

16 Claims, 6 Drawing Sheets

VEHICLE EVALUATION DEVICE AND VEHICLE EVALUATION METHOD

CROSS-REFERENCE TO RELATED APPLICATIONS

This is a continuation application of the prior PCT application PCT/JP2011/068021, filed on Aug. 8, 2011, pending, which claims priority from a Japanese patent application No. 2010-177544, filed on Aug. 6, 2010, the entire content of which is incorporated herein by reference.

TECHNICAL FIELD

The present invention relates to a vehicle evaluation apparatus, in particular, a vehicle evaluation apparatus that is effective in comparing and determining the economical advantages of a plurality of vehicles each of which is a candidate for a vehicle purchaser to purchase.

BACKGROUND

There has been evaluation methods related to safe driving, evaluation methods related to ride quality, evaluation methods related to fuel consumption saving, methods for evaluating performance such as speed and steering, and the like, as vehicle evaluation methods.

Recently, in warming problems and energy problems which are becoming obvious, fuel consumption and vehicle drive energy have drawn increasing attention. As a result, the prices of vehicles each designed for improving fuel efficiency and innovating vehicle drive energy are getting higher than before. In addition, the innovation and selection of vehicle drive energy make progress in each manufacturer, wherein vehicles in various drive energy modes, such as gasoline vehicles, hybrid vehicles, ethanol vehicles, and electric vehicles, are presented. In such circumstances, a perspective and an index are desired by vehicle purchasers, with which the cost effectiveness of those vehicles can be more clearly compared and examined, in the correlation between the prices of the abovementioned vehicles using various vehicle drive energy modes, and the fuel consumption and the drive energy consumption costs thereof.

Technological developments for reducing discharge amount of heat-trapping gases and for further improving fuel efficiency are reflected in general to the price of a vehicle using said technology; therefore, the vehicle price becomes high. Meanwhile, when a vehicle is distributed, wherein the fuel efficiency thereof is improved and the drive energy cost thereof is low even with a high vehicle price, more detailed evaluation of pros and cons would be necessary for a vehicle purchaser to evaluate, in the relationship between the vehicle price, which is included in the initial cost of a vehicle, and the fuel consumption and drive energy cost, which are reflected to the running cost thereof. In other words, in the case of an electric vehicle, for example, the vehicle price is higher than existing gasoline vehicles, but the cost of electricity which is the drive energy for driving the vehicle is lower than the cost of the drive energy of a gasoline vehicle. Consequently, it is questioned what is an index with which it is possible to compare the cost effectiveness of an electric vehicle, of which the price is high but the drive energy price is low, with the cost effectiveness of a gasoline vehicle, for example.

From this viewpoint, it would be important for the vehicle purchaser to compare/examine the relationship among the cost at the time of purchasing a vehicle, i.e., initial cost, the vehicle drive energy consumption cost which is a major part of the vehicle maintenance cost (running cost) thereof, and further, in the case of an electric vehicle comprising an electricity storing section capable of being charged as needed, the earning to be obtained by using the electricity storing section to an application other than driving the vehicle, with the relationships among other candidate vehicles for purchasing. There was no evaluation method from this viewpoint in existing vehicle evaluations.

Provided are: a vehicle evaluation apparatus and a vehicle evaluation system, wherein when a vehicle purchaser newly purchases a vehicle, it is possible to calculate economical indexes for different vehicles, based on the relationship among the initial cost at the time of purchasing the vehicle, the vehicle drive energy consumption cost, which is a major part of the vehicle maintenance cost for everyday driving, and the purchaser planned vehicle running distance which is planned by the purchaser, thereby comparing the economical efficiencies of the vehicles by thus calculated indexes; and a vehicle evaluation apparatus and a vehicle evaluation system, wherein in a vehicle having an electricity storing section capable of being charged as needed, it is possible to calculate earning to be obtained by using the electricity storing section to an application other than driving the vehicle, thereby comparing the economical effectiveness of the vehicles by thus calculated indexes.

In addition, the present invention presents an economical index for developmental technologies also to vehicle manufacturers, and the vehicle manufacturers would friendly compete with other vehicle manufactures in the pursuit of further technical innovation and cost effectiveness. As a result, vehicle purchasers would be able to enjoy continuous earning.

SUMMARY OF THE INVENTION

The vehicle evaluation system of the first invention of the present application is configured in such a manner as to comprise a portion for calculating the relationship between a price of a vehicle, a cost for purchasing the vehicle, or a cost obtained by adding a cost for maintaining the vehicle to the cost for purchasing the vehicle, and a fuel distance (distance to empty in km (kilometer) per unit drive energy, expressed in km/L, km/kWh or the like) that is expressed as the fuel efficiency of the vehicle.

The vehicle evaluation system of the second invention of the present application is configured in such a manner as to comprise a portion for calculating the relationship between an amount obtained by subtracting a predicted reselling price after use of a vehicle from a price of the vehicle, a cost for purchasing the vehicle, or a cost obtained by adding a cost for maintaining the vehicle to the cost for purchasing the vehicle, and a fuel distance (distance to empty per unit drive energy, expressed by km/L, km/kWh or the like) that is expressed as the fuel efficiency of the vehicle.

The vehicle evaluation system of the third invention of the present application is configured in such a manner as to comprise a portion for calculating the relationship among: a price of a vehicle, a cost for purchasing the vehicle, or a cost obtained by adding a cost (excluding drive energy consumption cost) for maintaining the vehicle to the cost for purchasing the vehicle; a predicted reselling price after use of the vehicle; a fuel distance (distance to empty per unit drive energy, expressed in km/L, km/kWh or the like) that is expressed as the fuel efficiency of the vehicle; a cost per certain unit drive energy (cost per 1 liter of a fuel such as gasoline, ethanol and hydrogen, or cost per kWh of electricity, when a fuel efficiency is expressed in km/L, km/kWh or the like, respectively) that represents the fuel efficiency of the vehicle; and a using/running distance planned by a vehicle purchaser (user), or the number of using days of the vehicle planned by the vehicle purchaser.

The vehicle evaluation system of the fourth invention of the present application is configured in such a manner as to comprise a portion for calculating a numerical value by dividing a cost, which is obtained by adding the cost of drive energy of a vehicle to be consumed by the vehicle in the case when the vehicle has run a using/running distance planned by a purchaser (user) of the vehicle, to a cost obtained by subtracting a predicted reselling price after use of the vehicle from a cost obtained by adding a price of a vehicle, a cost for purchasing the vehicle, or a cost obtained by adding the cost (excluding drive energy consumption cost) for maintaining the vehicle to the cost for purchasing the vehicle, by the using/running distance planned by the vehicle purchaser, or the number of using days of the vehicle planned by the vehicle purchaser.

In the abovementioned vehicle evaluation system, an electricity charge information displaying portion performs at least one of memorizing and inputting a high electricity charge and a low electricity charge, which have different values, respectively, and an earning information calculating portion may calculate an electricity charge for storing electricity based on the time of using high charge electricity and the time of using low charge electricity.

The abovementioned vehicle evaluation system further comprises a chargeable time information displaying portion for performing at least one of memorizing and inputting a first chargeable time when the electricity storing section can be charged by using the first electricity supplied from an electricity supply company, and a second chargeable time when the electricity storing section can be charged by using the second electricity provided by an electricity supply apparatus, wherein an electricity storage amount memorizing portion may perform at least one of memorizing and inputting an electricity storage amount per day in an electricity storing section equipped in the vehicle, that is calculated based on the first chargeable time and the second chargeable time.

The abovementioned vehicle evaluation system further comprises a unit electricity buying price information displaying portion for performing at least one of memorizing and inputting a unit electricity buying price at which an electricity buying company purchases a unit amount of electricity, wherein the earning information calculating portion may calculate the electricity using/selling earning based on the electricity storage amount per day and the unit electricity buying price.

The abovementioned earning information calculating portion may calculate the electricity using/selling earning based on the electricity charge corresponding to the amount of electricity when the electricity stored in the electricity storing section is used instead of purchasing the electricity that is used in a family or in a company from an electricity supply company.

The third mode of the present invention is a vehicle evaluation system comprising a first apparatus that a purchaser of a vehicle operates, and one or more of second apparatuses that are connected to the first apparatus through a network, wherein at least one of the first apparatus and the one or more of second apparatuses include: an information reading/selecting portion for performing at least one of reading and selecting of memorized and/or inputted (i) identification information on the vehicle, (ii) purchase cost of the vehicle, (iii) planned running distance of the vehicle, and (iv) unit energy consumption cost per unit running distance of the vehicle; a running energy consumption cost calculating portion for calculating running energy consumption cost in the case when the vehicle has run a planned running distance based on the unit energy consumption cost and the planned running distance of the vehicle; a vehicle evaluation calculating portion for calculating a first vehicle evaluation index by dividing a cost calculated based on the sum of the purchase cost of the vehicle and the running energy consumption cost of the vehicle, by the planned running distance; and a displaying portion for displaying the first vehicle evaluation index, and wherein the first apparatus and the one or more of the second apparatuses include a transmitting/receiving portion for transmitting/receiving at least one of the identification information, the purchase cost, the planned running distance, and the unit energy consumption cost through a network. In the abovementioned vehicle evaluation system, at least one of the first apparatus and the one or more of second apparatuses may further include a vehicle reselling price calculating portion for calculating a vehicle reselling price of the vehicle based on the planned running distance and the identification information on the vehicle, and the vehicle evaluation calculating portion may calculate the first vehicle evaluation index by dividing a cost obtained by subtracting the vehicle reselling price from the sum of the purchase cost and the running energy consumption cost, by the planned running distance. The abovementioned information reading/selecting portion further performs at least one of reading and selecting of memorized and/or inputted planned vehicle owning-year information on the vehicle, planned vehicle non-using day information on the vehicle that shows the number of days that a vehicle is not planned to be used, unit electricity charge that shows the electricity charge per unit hour, and electricity storage amount per day in an electricity storing section equipped in the vehicle, wherein at least one of the first apparatus and the one or more of second apparatuses include: an earning information calculating portion for calculating using/selling earning obtained by storing electricity in the electricity storing section equipped in the vehicle based on the difference between the electricity charge for storing the amount of electricity per day, which is calculated based on the unit electricity charge, and the earning that is obtained by at least one of using and selling of electricity that corresponds to the electricity storage amount per day, the planned vehicle owning-year information, and the planned vehicle non-using day information; and a vehicle evaluation calculating portion for calculating a using/selling vehicle evaluation index by dividing the numerical value obtained by subtracting the electricity using/selling earning from a cost calculated based on the sum of the purchase cost and the running energy consumption cost, by the planned running distance, wherein the displaying portion may display at least one of the first vehicle evaluation index, the electricity using/selling earning, and the using/selling electricity vehicle evaluation index.

The fourth mode of the present invention presents a vehicle evaluation system provided with a first apparatus that a purchaser of a vehicle operates, and one or more of second apparatuses that are connected to the first apparatus through a network, wherein at least one of the first apparatus and the one or more of second apparatuses include: an information reading/selecting portion for performing at least one of reading and selecting of memorized and/or inputted identification information on the vehicle, planned vehicle owning-year information on the vehicle, planned vehicle non-using day information that shows the number of days that a vehicle is not planned to be used, unit electricity charge that shows an electricity charge per hour, and (v) electricity storage amount per day in an electricity storing section equipped in the vehicle; an earning information calculating portion for calculating electricity using/selling earning obtained by storing electricity in the electricity storing section equipped in the vehicle based on (i) the difference between the electricity charge for storing the amount of electricity per day that is calculated based on the unit electricity charge, and the earning that is obtained by at least one of using and selling of electricity that corresponds to the electricity storage amount per day, (ii) the planned vehicle owning-year information, and the planned vehicle non-using day information; a vehicle evaluation calculating portion for calculating a using/selling vehicle evaluation index based on the electricity using/selling earning; and a displaying portion for displaying the using/selling electricity vehicle evaluation index, wherein the first apparatus and the one or more of the second apparatuses include a transmitting/receiving portion for transmitting and/or receiving at least one of the identification information, planned vehicle owning-year information, planned vehicle non-using day information, the unit electricity charge and the electricity storage amount per day, through the network.

The fifth mode of the present invention presents a vehicle evaluation system that is configured in such a manner as to comprise: a vehicle identification information displaying portion for memorizing or inputting vehicle identification information, such as model, type, vehicle type, fuel efficiency, weight tax, acquisition tax, vehicle electricity storage amount, and chargeable time for vehicle electricity storage amount, of each of a plurality of vehicles, which comprises an electricity storing section capable of being charged as needed; a purchaser planned vehicle owning-year information displaying portion for memorizing or inputting the purchaser planned vehicle owning-year information on the vehicle; a purchaser planned vehicle non-using day information displaying portion for memorizing or inputting purchaser planned vehicle non-using day information on the vehicle; an electricity charge system information displaying portion for memorizing or inputting electricity charge system information that specifies a low electricity charge and a high electricity charge, which are different charges of electricity supplied from an electricity supply company, according to the conditions of use of the electricity; a purchaser electricity consumption information displaying portion for memorizing or inputting purchaser electricity consumption information that represents an electricity consumption of the purchaser during a predetermined period, and also represents low charge electricity using time and low charge electricity consumption, high charge electricity using time and high charge electricity consumption, purchaser total electricity using time, which is the sum of the time of using low charge electricity and the time of using high charge electricity, and purchaser total electricity consumption, which is the total of low charge electricity consumption and high charge electricity consumption; a unit electricity buying price information displaying portion for memorizing or inputting unit electricity buying price information at the time when an electricity buying company purchases electricity from a third party; an electricity company electricity chargeable time information displaying portion for memorizing or inputting, in the case where the vehicle purchaser charges electricity from the electricity supply company to an electricity storing section of said vehicle, low electricity charge time information indicating a time in which electricity can be charged with the low electricity charge, high electricity charge time information indicating a time in which electricity can be charged with the high electricity charge, and a time in which electricity from the electricity supply company can be charged, said time being the sum of the low electricity charge time information and high electricity charge time information; an electricity supply apparatus chargeable time information displaying portion for memorizing or inputting electricity supply apparatus chargeable time information indicating a time in which the vehicle purchaser can charge electricity from an electricity supply apparatus other than that from the electricity supply company; an information reading/selecting portion for reading/selecting or selecting stored information, according to whether information that has been memorized or inputted in the abovementioned respective portion is either memorized or inputted in the abovementioned respective portion; a stored electric energy using/selling earning information calculating portion comprising the steps of selecting the information that has been memorized by the information reading/selecting portion or the information that has been inputted, for each piece of information that has been memorized or inputted in each of the abovementioned portion, combining and using any pieces of information among thus selected information (hereinafter referred to as "information reading/selecting portion selection information"), which are the purchaser planned vehicle owning-year information, purchaser planned vehicle non-using day information, electricity charge system information, purchaser electricity consumption information, unit electricity buying price information, electricity chargeable time information on an electricity company, and chargeable time information on an electricity supply apparatus, charging and storing electric energy supplied from the electricity company and/or electric energy supplied from an electric energy supply apparatus other than the electricity supplied from the electricity company, and calculating earning (hereinafter referred to as "stored energy selling earning") obtained by selling electric energy to the electricity buying company, and/or the earning obtained by using the electricity as electric energy for family use or for industrial use of the vehicle purchaser; a displaying portion for displaying, in a timely and sequential manner, the abovementioned information inputting/selecting portion selection information, and the stored electric energy using/selling earning information calculated by the stored electric energy using/selling earning information calculating portion. The vehicle evaluation system is further configured in such a manner as to: select information that is read, selected or inputted by an information reading/selecting portion, according to whether the abovementioned vehicle identification information displaying portion has memorized or inputted vehicle identification information on one vehicle in the multiple pieces of vehicle identification information from the vehicle identification information displaying portion, thereby displaying the selected vehicle identification information on one vehicle; read/select the information, which is memorized by the information reading/selecting portion, or select the information, which is inputted, according to whether each piece of the selected information on one vehicle is memorized or inputted in each portion (hereinafter referred to as "each portion other than calculation identification portion") excluding the stored electric energy using/selling earning information calculating portion and vehicle identification information displaying portion, is memorized or inputted, according to whether each information is memorized or inputted from said each portion other than calculation identification portion to said each portion other than calculation identification portion, thereby displaying each of the selected information on the abovementioned displaying portion; calculate, using the vehicle electricity storage amount and vehicle electricity storage amount charging time in each piece of information, which is selected and displayed on the displaying portion, and the electricity chargeable time information on the electricity company and/or the electricity chargeable time information on the electricity supply apparatus, a stored amount per day (less than or equal to the vehicle electricity storage amount, expressed in kWh, hereinafter referred to as "electric energy storage amount information") of electric energy that the vehicle purchaser can charge and store, in an electricity storing section of the vehicle of the purchaser, electricity supplied from the electricity company and/or an electricity supply apparatus other than the electricity company, by multiplying the vehicle electricity storage amount with a numerical value obtained by dividing the electricity chargeable time information on the electricity company and/or the electricity chargeable time information on the electricity supply apparatus, by the vehicle electricity storage amount charging time; display the calculated electric energy storage amount information on the displaying portion, wherein the stored electric energy using/selling earning information calculating portion is configured in such a manner as to calculate earning (hereinafter referred to as "earning A") obtained by charging and storing electric energy supplied from the electricity company into the electricity storing section of the vehicle, and using the stored electric energy as the electric energy for family use or for industrial use of the vehicle purchaser during the high electricity charge time in the electricity charge system information, and display thus calculated earning on the displaying portion. More specifically, said stored electric energy using/selling earning information calculating portion is configured in such a manner as to: determine (hereinafter referred to as "determination of electric energy storage amount information") whether the electric energy storage amount information on the electric energy stored into the electricity storing section of the vehicle is more than the purchaser electricity consumption information, or less than or equal to the purchaser electricity consumption information, based on respective pieces of numerical value information, add a numerical value obtained by multiplying the low electricity charge with the low electricity charge time information, to a numerical value obtained by multiplying the high electricity charge with the high electricity charge time information, in the case where the determination result is that the electric energy storage amount information is larger than the purchaser electricity consumption information; divide thus obtained numerical value by the electric energy storage amount information; subtract thus obtained numerical value from the high electricity charge; multiply thus obtained numerical value with the purchaser electricity consumption information; multiply thus obtained numerical value with purchaser vehicle non-using day information (per month); multiply thus obtained numerical value with 12 (per year); and multiply thus obtained numerical value with purchaser planned vehicle owning-year information. In addition, the stored electric energy using/selling earning information calculating portion is configured in such a manner as to calculate earning and display thus calculated earning on the displaying portion. More specifically, said stored electric energy using/selling earning information calculating portion is configured in such a manner as to: add a numerical value obtained by multiplying the high electricity charge with the high electricity charge time information to a numerical value obtained by multiplying the low electricity charge with the low electricity charge time information, in the case where the determination of electric energy storage amount information is that the electric energy storage amount information is less than or equal to the purchaser electricity consumption information; divide thus obtained numerical value by the electric energy storage amount information; subtract thus obtained numerical value from the high electricity charge; multiply thus obtained numerical value with the electric energy storage amount information; multiply thus obtained numerical value with purchaser vehicle non-using day information (per month); multiply thus obtained numerical value with 12 (per year); and multiply thus obtained numerical value with purchaser planned vehicle owning-year information, thereby calculating information. The stored electric energy using/selling earning information calculating portion is configured in such a manner as to calculate earning (hereinafter referred to as "earning B") obtained by charging and storing electric energy supplied from the electricity company into the electricity storing section of the vehicle, and selling the stored electric energy to the electricity buying company, and to display thus calculated information on the displaying portion. More specifically, said stored electric energy using/selling earning information calculating portion is configured in such a manner as to: add a numerical value obtained by multiplying the high electricity charge with the high electricity charge time information, to a numerical value obtained by multiplying the low electricity charge with the low electricity charge time information; divide thus obtained numerical value by the electric energy storage amount information; subtract thus obtained numerical value from the unit electricity buying price information; multiply thus obtained numerical value with the purchaser electricity consumption information; multiply thus obtained numerical value with purchaser vehicle non-using day information (per month); multiply thus obtained numerical value with 12 (per year); and multiply thus obtained numerical value with purchaser planned vehicle owning-year information. The stored electric energy using/selling earning information calculating portion is configured in such a manner as to calculate earning (hereinafter referred to as "earning C") obtained by charging and storing electric energy supplied from the electricity supply apparatus into the electricity storing section of the vehicle, and using the stored electric energy as the electric energy for family use or for industrial use of the vehicle purchaser, by multiplying the high electricity charge in the purchaser planned vehicle owning-year information with the numerical value obtained by multiplying the electricity charge system information with the electric energy storage information, multiplying thus obtained numerical value with the purchaser planned vehicle non-using day information, and multiplying thus obtained numerical value with the purchaser planned vehicle owning-year information, and to display thus calculated information on the displaying portion. The stored electric energy using/selling earning information calculating portion is configured in such a manner as to calculate earning (hereinafter referred to as "earning D") obtained by charging and storing electric energy supplied from an electricity supply apparatus other than the electricity company into the electricity storing section of the vehicle, and selling the stored electric energy to the electricity buying company, by multiplying the electric energy storage information with the unit electricity buying price information, multiplying thus obtained numerical value with the purchaser planned vehicle non-using day information, and multiplying thus obtained numerical value with the purchaser planned vehicle owning-year information, and to display thus calculated information on the displaying portion. The stored electric energy using/selling earning information calculating portion is configured in such a manner as to calculate earning in combination with calculating methods of earning A and earning C, when said earning is obtained by charging and storing electric energy supplied from the electricity company and electric energy supplied from an electricity supply apparatus other than the electricity company into the electricity storing section of the vehicle, and using the stored electric energy as the electric energy for family use or for industrial use of the vehicle purchaser, and the stored electric energy using/selling earning information calculating portion is configured in such a manner as to calculate earning in combination with calculating methods of earning B and earning D, when said earning is obtained by charging and storing electric energy supplied from the electricity company and electric energy supplied from an electricity supply apparatus other than the electricity company into the electricity storing section of the vehicle, and selling the stored electric energy to the electricity buying company.

The sixth mode of the present invention provides a vehicle evaluation system comprising a portion for calculating a numerical value obtained by: subtracting a predicted reselling price after use of the vehicle and earning amount obtained by using and/or selling electric energy to be stored and/or generated in the vehicle, said electric energy being used for other than driving the vehicle, from the cost obtained by adding a price of the vehicle, a cost for purchasing the vehicle, or a cost obtained by adding the cost for maintaining (excluding drive energy consumption cost) the vehicle to the cost for purchasing the vehicle; adding, to thus obtained difference, a cost of drive energy to be consumed by the vehicle when a vehicle purchaser has run a using/running distance of the vehicle, which is planned by the vehicle purchaser; and dividing thus obtained sum with a vehicle running distance, which is planned by the vehicle purchaser, or with a vehicle using day, which is also planned by the vehicle purchaser.

The seventh mode of the present invention provides a vehicle evaluation system that is configured, in order to obtain a numerical value as an evaluation index of a vehicle, in such a manner as to: multiply a vehicle non-using day per year (hereinafter referred to as "annual vehicle non-using day"), which is planned by the vehicle purchaser, with the number of years that the vehicle purchaser plans to own the vehicle; multiply thus obtained numerical value with the amount of electricity (kWh) that the vehicle purchaser charges per day from an electricity supply company and/or an electricity generation apparatus (such as power generation apparatus by natural energy and fuel cell) other than the electricity supply company, into the electricity storing section of the vehicle of the vehicle purchaser, which is capable of being charged as needed; and divide thus obtained numerical value by electricity charge (charge per kWh) of the electricity supply company that the vehicle purchaser uses, or by a unit electricity buying price (price per kWh) when an electricity buying company purchases electricity from a third party.

The eighth mode of the present invention provides a vehicle evaluation system comprising a portion for calculating a numerical value obtained by: subtracting a predicted reselling price after use of a vehicle and earning obtained by charging and storing electric energy supplied from an electricity supply company and/or electric power from an electricity supply apparatus other than the electricity supply company into the vehicle and using said electric energy for family use of a purchaser of the vehicle, or earning amount obtained by selling thus stored electric energy to an electricity buying company, from the cost obtained by adding a price of the vehicle, a cost for purchasing the vehicle, or a cost obtained by adding the cost for maintaining (excluding drive energy consumption cost) the vehicle to the cost for purchasing the vehicle; adding, to thus obtained cost, the cost of drive energy that the vehicle consumes when the vehicle purchaser has run the vehicle a planned vehicle using/running distance; and dividing thus obtained cost by a vehicle running distance planned by the vehicle purchaser, or by a vehicle using day planned by the vehicle purchaser.

The present invention is effective, in particular, when a vehicle purchaser compares a vehicle with other candidate vehicles for purchasing, with respect the relationship between a cost for purchasing the vehicle, i.e., initial cost, and a drive energy consumption cost, which is a main part of maintenance cost necessary for everyday driving.

It is possible to provide each of the vehicle evaluation apparatuses in the claims of the present invention as a vehicle evaluation system, and each of the vehicle evaluation systems therein as a vehicle evaluation apparatus.

Embodiment 1 of the present invention is configured in such a manner as to comprise a portion for calculating the relationship between a price of a vehicle, a cost for purchasing the vehicle, or a cost obtained by adding a cost for maintaining the vehicle to the cost for purchasing the vehicle (hereinafter referred to as "cost of vehicle purchasing cost and the like"), and a fuel distance (distance to empty in km per unit drive energy, expressed in km/L, km/kWh or the like) that is expressed as the fuel efficiency of the vehicle. Note that the vehicle herein is applicable to any vehicle such as, for example, passenger car, truck, bus, bike, and electric vehicle, that runs on the ground. In addition, the vehicle herein is applicable to any machine such as airplane that flies on air using drive energy, and helicopter. Furthermore, the vehicle herein is applicable to any machine such as ship that runs on the sea using drive energy. Moreover, the vehicle herein is applicable to any instrument and machine, such as home electric appliance and factory machine, which operate using drive energy.

The portion for calculating the relationship between the cost of vehicle purchasing cost and the like, and the fuel distance of the vehicle can express, as an evaluation value, the ratio of vehicle fuel efficiency relative to the vehicle price (the larger the value is, the higher the cost effectiveness is), by dividing the fuel efficiency of the vehicle with the cost of vehicle purchasing cost and the like, for example.

The portion for calculating the relationship between the cost of vehicle purchasing cost and the like, and the fuel distance of the vehicle can express, as an evaluation value, the ratio of vehicle price relative to fuel charge for 1 km (the smaller the value is, the higher the cost effectiveness is), by dividing the cost of vehicle purchasing cost and the like with the fuel efficiency of the vehicle, for example. Any evaluation method other than these examples, which is based on the comparison of the cost of vehicle purchasing cost and the like, and the fuel efficiency of the vehicle, may be applicable. For example, an evaluation value calculated using a predetermined coefficient and the like, based on the cost of vehicle purchasing cost and the like, and the fuel efficiency of the vehicle, can be expressed as the evaluation value of the present invention. In other word, embodiment 1 of the present invention is characterized in comparing the cost of vehicle purchasing cost and the like, with the fuel efficiency of the vehicle, to evaluate vehicles.

Here, vehicle purchase price, tax (registration fee, weight tax and the like), insurance fee (compulsory automotive liability insurance fee, voluntary automotive insurance fee and the like) and the like, for example, are listed as the cost for purchasing vehicle and the like. Meanwhile, repair cost, automotive inspection cost, other inspection cost, parking fee, road fee (highway tolls and the like), drive energy consumption cost (note that the drive energy consumption cost is separately categorized and handled in the present invention to be explained by the embodiment below or the like), scrap cost and the like are listed as the maintenance cost of a vehicle. However, since the purpose of the present invention is to compare/examine cost effectiveness among candidate vehicles, when purchasing a vehicle, a numerical value, such as parking fee, having small differences with those of other vehicles does not have to be an important evaluation item.

In embodiment 1 of the present invention, the evaluation value of a vehicle is represented, as the most convenient method, by a value obtained by dividing the fuel distance of a vehicle with the price of the vehicle.

In other words, the fuel distance of a vehicle is apprehended as the most important information representing the cost effectiveness of the vehicle, and vehicle evaluation is made possible by dividing the numerical value of said fuel efficiency by the price of the vehicle, with which comparison with the vehicles of other manufacturers is possible in terms of how much technological development fee is reflected on the price of the vehicle in order to increase cost effectiveness. For example, in the comparison of vehicles of different manufactures, when the fuel efficiency and price of an A Company vehicle are 20 km/L and 1,000,000 yen, respectively, and the fuel efficiency and price of a B Company vehicle are 20 km/L and 1,500,000 yen, respectively, the evaluation value of the A Company vehicle is 0.00002 and the evaluation value of the B Company vehicle is 0.000013, which leads to an evaluation in which the A Company vehicle having a higher numerical value has a higher fuel efficiency relative to price, than the B Company vehicle.

In addition, it is also possible as stated above to evaluate a vehicle planned to purchase, by using the cost for purchasing vehicle and the like as a cost necessary for purchasing the vehicle, and dividing said necessary cost by the fuel distance of the vehicle.

Embodiment 2 of the present invention is configured in such a manner to have a portion for calculating the relationship between a cost obtained by subtracting the predicted reselling price after use of a vehicle from a cost which is a price of the vehicle, a cost for purchasing the vehicle, or a cost obtained by adding a cost for maintaining the vehicle to the cost for purchasing the vehicle (hereinafter referred to as "cost for purchasing vehicle and the like"), and the fuel distance that is expressed as the fuel efficiency of the vehicle.

In embodiment 2 of the present invention, a cost element is set in addition to the evaluation calculation element of embodiment 1 of the present invention, said cost element being obtained by subtracting the predicted reselling price after use of the vehicle from the cost for purchasing vehicle and the like. The payment amount of the vehicle purchaser substantially for purchasing the vehicle is made clearer with the cost element.

It is possible to estimate a predicted reselling price after use of a vehicle according to, for example, the model, type and purchase price of the vehicle, a vehicle using-year predicted by a purchaser, a vehicle running distance planned by the purchaser, history such as accident and failure, and the like. In addition, there are services, nowadays also on websites, for estimating and providing a reselling price of a vehicle, and a predicted price may be obtained by using said services. Furthermore, the vehicle evaluation system of the present invention may independently and separately have a predicted reselling price calculating portion for calculating the predicted reselling price of a vehicle. It is possible to calculate a predicted reselling price after use of a vehicle by the predicted reselling price calculating portion, by setting, as calculation elements, the model, type, and purchase price of the vehicle, the vehicle using-year predicted by the purchaser, the vehicle running distance predicted by the purchaser, the history of accident and failure, and the like, for example.

In embodiment 2 of the present invention, the portion for calculating the relationship between a cost obtained by subtracting a predicted reselling price after use of the vehicle from the cost for purchasing vehicle and the like, and the fuel efficiency of the vehicle, is configured in such a manner as to express said relationship as an evaluation value of the cost effectiveness of the vehicle, by dividing the fuel distance of the vehicle by a cost obtained by subtracting the predicted reselling price after use of the vehicle from the cost for purchasing vehicle and the like. The reason why said relationship can be utilized as an evaluation value of cost effectiveness, and a specific example of the method therefor are the same as those of the example disclosed in embodiment 1 of the present invention.

In addition, embodiment 2 of the present invention is not limited to the calculation method mentioned here, but may be any other evaluation method as far as said evaluation method is based on comparing a cost obtained by subtracting a predicted reselling price after use of the vehicle from the cost for purchasing vehicle and the like, with the fuel distance of the vehicle. For example, a calculation method for calculating an evaluation value by setting or using a certain coefficient, based on the cost obtained by subtracting a predicted reselling price after use of the vehicle from the cost for purchasing vehicle and the like, and the fuel distance of the vehicle, can be expressed as the evaluation value of the present invention.

Embodiment 3 of the present invention is configured in such a manner as to comprise a portion for calculating the relationship among: a cost obtained by subtracting a predicted reselling price after use of a vehicle from a price of the vehicle, a cost for purchasing the vehicle, or a cost obtained by adding a cost (excluding drive energy consumption cost) for maintaining the vehicle to the cost for purchasing the vehicle (hereinafter referred to as "cost for purchasing vehicle and the like"); the fuel distance of the vehicle; a cost per certain unit of drive energy (cost per liter of a fuel such as gasoline, ethanol and hydrogen, or a cost per kWh of electricity, when a fuel efficiency is expressed in km/L, km/kWh or the like, respectively) that represents the fuel efficiency of the vehicle; and a using/running distance, which is planned by a purchaser (user) of the vehicle, or a vehicle using day, which is planned by the purchaser of the vehicle. The "portion for calculating the relationship" is explained below.

If the fuel efficiency of a vehicle using gasoline as the vehicle drive energy, for example, is 20 km/L, it portion that said vehicle can run an average distance of 20 km with 1 liter of gasoline; therefore, the cost per certain unit of drive energy, which represents the fuel efficiency of the vehicle, portion the price of 1 liter of gasoline for the vehicle that can run an average distance of 20 km per 1 liter of gasoline at the time of calculation, for example. In other words, if the price of 1 liter of gasoline at a certain time is 130 yen, 130 is the numerical amount value.

In addition, there are various kinds of energy sources for driving a vehicle, such as gasoline (regular gasoline, high-octane gasoline, and the like), light oil, kerosene, gas, ethanol, hydrogen and electricity, but the cost per certain unit of drive energy for any energy source, which represents the fuel efficiency of the vehicle, is made possible to be set or inputted as a calculation item in the method for calculating the abovementioned relationship. For example, in the case where the fuel efficiency (electricity efficiency) is represented as 10 km/kWh, and electricity charge for 1 kWh is 22 yen, for example, the cost per certain unit of drive energy, which represents the fuel efficiency of the vehicle, is 22 (yen).

The using/running distance of a vehicle, which is planned by a purchaser (user) of the vehicle, is explained below. The using/running distance of a vehicle, which is planned by a purchaser (user) of the vehicle, is a numerical value of predicted using/running distance of a candidate vehicle to be newly purchased. In order to set a using/running distance of the planned vehicle, a using/running distance of the vehicle to be purchased is predicted, for example, by considering the method for utilization (commuting, leisure, transportation, commercial and the like) of a vehicle that has been used in the past, and by confirming the running distance which the vehicle that has been used in the past has run, on the vehicle instrument thereof. Even a first-time vehicle purchaser can obtain a predicted using/running distance of a candidate vehicle to be purchase, by considering the method for utilization of the vehicle, using-year from now on, the using frequency (how many days a week, and how much distance to run per day), and the like. The planned using/running distance of the vehicle is configured in such a manner as to be substantially the same as those of other candidate vehicles to be compared with.

The vehicle using day, which is planned by a purchaser of a vehicle, is a numerical value obtained by predicting the number of days in which a vehicle is planned to be used, from a time when the purchaser of a vehicle newly purchases the vehicle to a time when the vehicle purchaser relinquishes or scraps the vehicle. It is possible for the purchaser to predict said numerical value, from a similar viewpoint to the planned vehicle using/running distance. The vehicle using day, which is planned by the purchaser of the vehicle, is configured in such a manner as to be substantially the same as those of other candidate vehicles to be compared with.

The "portion for calculating the relationship" in embodiment 3 of the present invention is configured, for example, in such a manner as to: multiply a numerical value obtained by dividing the vehicle using/running distance planned by a purchaser (user) of the vehicle, by the fuel distance (km) of the vehicle, with a cost per certain unit of drive energy, which represents the fuel efficiency of the vehicle; add the cost for purchasing vehicle and the like to thus obtained numerical value; subtract the predicted reselling price after use of the vehicle from thus obtained numerical value; and divide thus obtained numerical value by the vehicle using/running distance or vehicle using day, which are planned by the purchaser of the vehicle. Note that the calculation sequence is not limited to that indicated above, and any calculation method, which meets the intention of calculation method similar to the calculation method of the present invention, may be applicable.

In addition, the invention as described in claims 12 and 13, which discloses application models of embodiment 3 of the present invention, is configured, for example, in such a manner as to: multiply a numerical value obtained by dividing the vehicle using/running distance planned by a purchaser (user) of the vehicle by the fuel distance (km) of the vehicle, with a cost per certain unit of drive energy, which represents the fuel efficiency of the vehicle; add the cost for purchasing vehicle and the like to thus obtained numerical value; subtract the predicted reselling price after use of the vehicle from thus obtained numerical value; and divide thus obtained numerical value by the vehicle using/running distance or vehicle using day, which are planned by the purchaser of the vehicle.

Embodiments of the present invention have been discussed so far, but the vehicle evaluation system of each of embodiments 1-3 may be configured in such a manner as to include a numerical value for evaluating the discharge amount of greenhouse gases.

The discharge amount of greenhouse gases (mainly carbon dioxide) of a vehicle is determined by the drive energy type (fuel type) and the consumption amount thereof. For example, the calculating formula of a carbon dioxide emission coefficient for each drive energy type (fuel type) is expressed as: ($CO_2$ emission coefficient (kg-C/MJ))=(carbon content (kg-C/kg, kg-C/L or kg-C/$Nm^3$))/(unit calorific power (MJ/kg, MJ/L or MJ/$Nm^3$)). In addition, a calculation formula of the discharge amount of carbon dioxide is expressed as, for example: ($CO_2$ discharge amount (kg-$CO_2$))=(fuel use (L))×($CO_2$ emission coefficient (kg-$CO_2$/L)). Accordingly, when a purchaser evaluates the discharge amount of carbon dioxide of a candidate vehicle for purchasing, the discharge amount of carbon dioxide thereof can be obtained by dividing the vehicle running distance planned by the purchaser, by the numerical value of the fuel efficiency of the vehicle, and by multiplying thus obtained numerical value with the discharge coefficient. It is possible to calculate and compare the discharge amounts of carbon dioxide of other vehicles, in a similar manner.

DETAILED DESCRIPTION OF PREFERRED EMBODIMENTS

Figure 1:
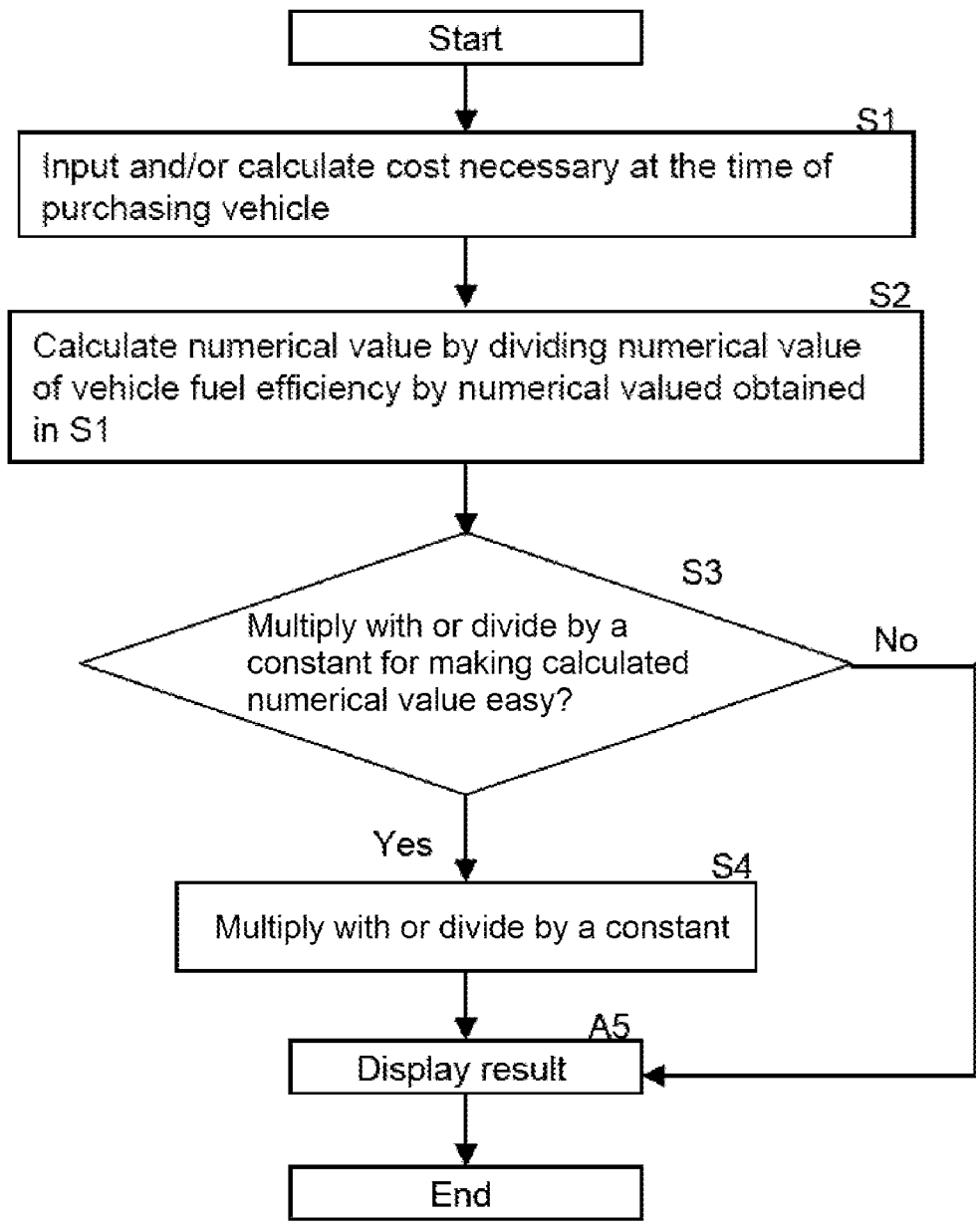
FIG. 1 is a flow chart for calculating the evaluation of a vehicle using a vehicle purchase cost and a numerical value of fuel efficiency. (Example 1)

The system, as illustrated in FIG. 1, to which this invention is applied, is configured in such a manner as to: input a cost necessary for purchasing a vehicle, such as the cost for purchasing vehicle and the like; input/select the cost from a separately prepared database; or calculate, if needed, the cost based on data memorized in the database, in step 1 (S1). Said step 1 is configured in such a manner as to, when using a database in such a manner as described above, for example, prepare the database for each vehicle model and each type, or calculate the database in a timely manner based on database information, and read, select and arrange, or automatically arrange the database. In addition, step 1 may be configured in such a manner as to, when using the database, read/select the cost for purchasing vehicle and the like, and the model and type of a vehicle that a purchaser plans to purchase by using a text retrieval function and the like.

Step 2 (S2) of FIG. 1 is configured in such a manner as to calculate the evaluation value of the candidate vehicle by dividing the fuel distance of the vehicle by the numerical valued obtained by step 1.

The fuel distance of the vehicle, which is used in step 2, is configured in such a manner as to be inputted or read/selected from a separately prepared database.

The purpose of the processing in step 3 (S3) of FIG. 1 is explained below. In step 2 of FIG. 1, wherein the price of a candidate vehicle for purchasing is 1,000,000 yen and the fuel efficiency thereof is 20 km/L, for example, the value obtained by dividing 20 by 1,000,000 is 0.00002. Said value is hard to see for the purchaser, or is expected to be confusing, so that a processing for multiplying the numerical value with 100,000, for example, makes the value to be 2, which is friendly. Step 3 in FIG. 1 does not change the evaluation value itself; therefore, it may be possible to skip said step 3 and step 4, i.e. go from step 2 (S2) to step 5 (S5).

A similar effect of step 3 of FIG. 1 can be achieved by changing the fuel distance display in step 2. In other words, when the purchase price of a candidate vehicle for purchasing is 1,000,000 yen and the fuel efficiency thereof is 20 km/L, the evaluation value is 0.02 or 2 by setting the fuel distance to be 20,000 m/L or 2,000,000 cm/L, respectively. It may be possible to automatically convert the value of fuel efficiency from km/L to m/L or cm/L, in step 2 of FIG. 1, in order to obtain said effect.

If multiplying a constant value is selected in step 3 of FIG. 1, the process goes to step 4.

If multiplying a constant value is not selected in step 3 of FIG. 1, the process goes to step 5.

In addition, it may be possible to skip the processing of step 3 of FIG. 1, and automatically multiply a constant numerical value to the numerical value obtained in step 2. In this case, the process goes from step 2 to step 4.

Step 4 of FIG. 1 is configured in such a manner as to multiply the numerical value obtained in step 2 with a constant numerical value.

Step 5 of FIG. 1 is configured in such a manner as to display the numerical value obtained in step 4 or step 2.

The system of FIG. 1 of the present invention is explained here. Said system may be a method for processing steps 1-5 in one apparatus (terminal), and presenting an evaluation, or may be a system in which steps 1-4 for calculating/processing an evaluation and step 5 for displaying calculated evaluation are connected to each other via a network, such as the Internet. In other words, said system may be configured in such a manner that calculating/processing in steps 1-4 is performed in a server apparatus and displaying in step 5 is performed in a terminal connected to the server apparatus via a network, for example. In the case of a system in which apparatuses are connected to each other via a network, the abovementioned terminal may be better to be configured in such a manner as to perform the start and input processing in each step.

Figure 2:
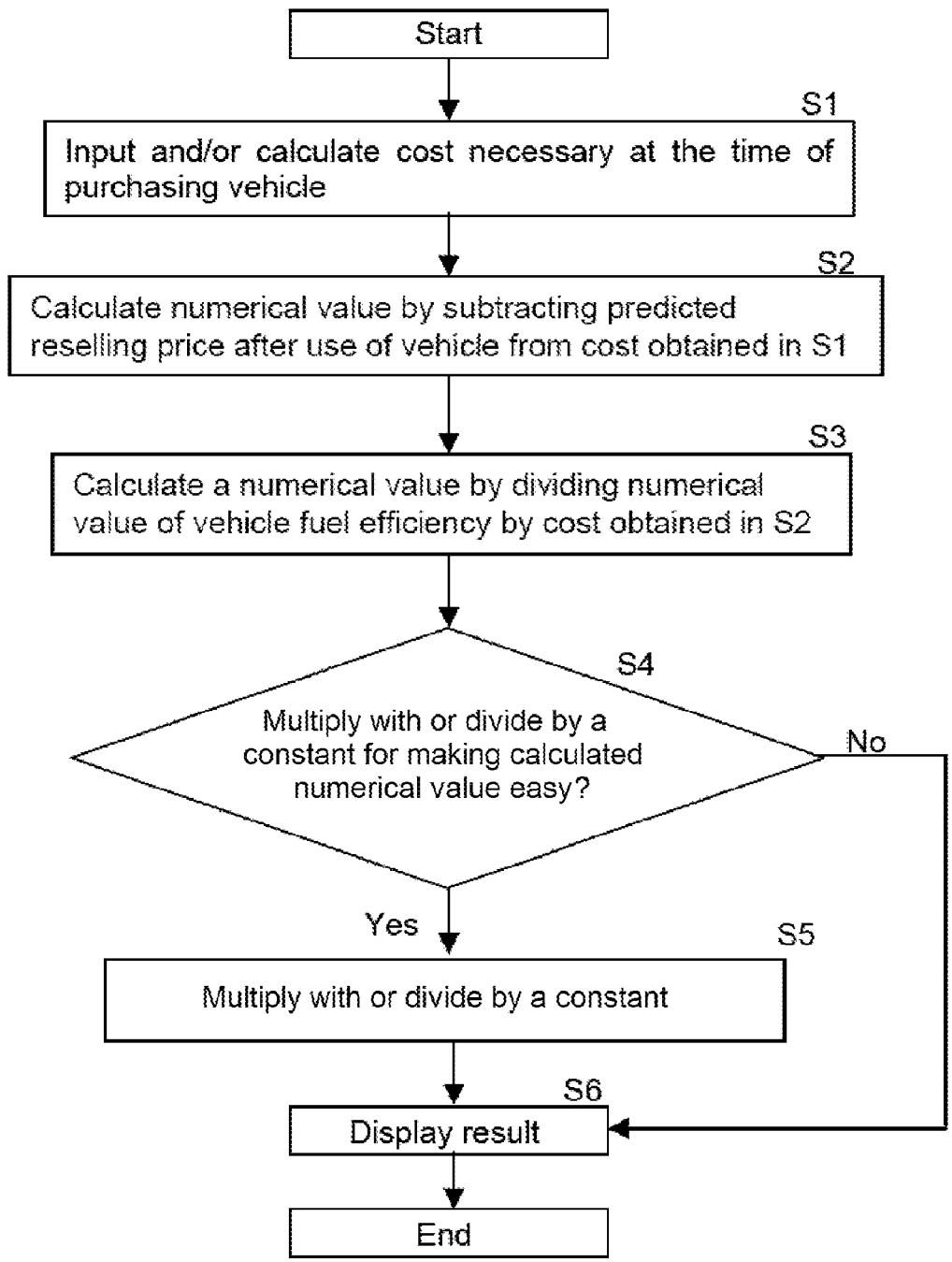
FIG. 2 is a flow chart for calculating the evaluation of a vehicle using a numerical value obtained by subtracting a predicted reselling price from a vehicle purchase cost, and a numerical value of fuel efficiency. (Example 2)

Next, the system, as illustrated in FIG. 2, to which this invention is applied, is a system in which a step of "inputting and/or calculating a cost obtained by subtracting a predicted reselling price after use of a vehicle from the cost obtained in step 1", which serves as step 2 (S2) of FIG. 2, is inserted in step 1 (S1) and step 2 (S2) on the system illustrated and explained in FIG. 1.

It is possible as mentioned above to predict a predicted reselling price after use of the vehicle, which is inputted and/or calculated in step 2 in the system of FIG. 2, according to the model, type, purchase price of the vehicle, the vehicle using-year predicted by the purchaser, the vehicle using/running distance planned by the purchaser, the history of accident and failure, and the like. In addition, there are services on the website nowadays, each of which predicts and provides a reselling price of a vehicle so that a predicted cost may be obtained by using such services. Furthermore, the vehicle evaluation system of the present invention may independently and separately have a predicted reselling price calculating portion for calculating the predicted reselling price of a vehicle. It is possible to calculate the reselling price after use of a vehicle in the predicted reselling price calculating portion, by setting, as calculation elements, the model, type and purchase price of the vehicle, the vehicle using-year predicted by the purchaser, the vehicle using/running distance planned by the purchaser, the history of accident and failure, and the like, for example.

Step 4 (S4) and step 5 (S5) in the system of FIG. 2 of the invention intend to provide the same meaning and effect as those of step 3 (S3) and step 4 (S4) of FIG. 1, the explanation on which is omitted here. It may be possible to skip step 4 (S4) and step 5 (S5) of FIG. 2, and go from step 3 (S3) to step 6 (S6). In addition, the system in FIG. 2 of the invention may process steps 1-5 in a server apparatus, and step 6 and start in a terminal apparatus connected to the server apparatus via a network, for example.

Figure 3:
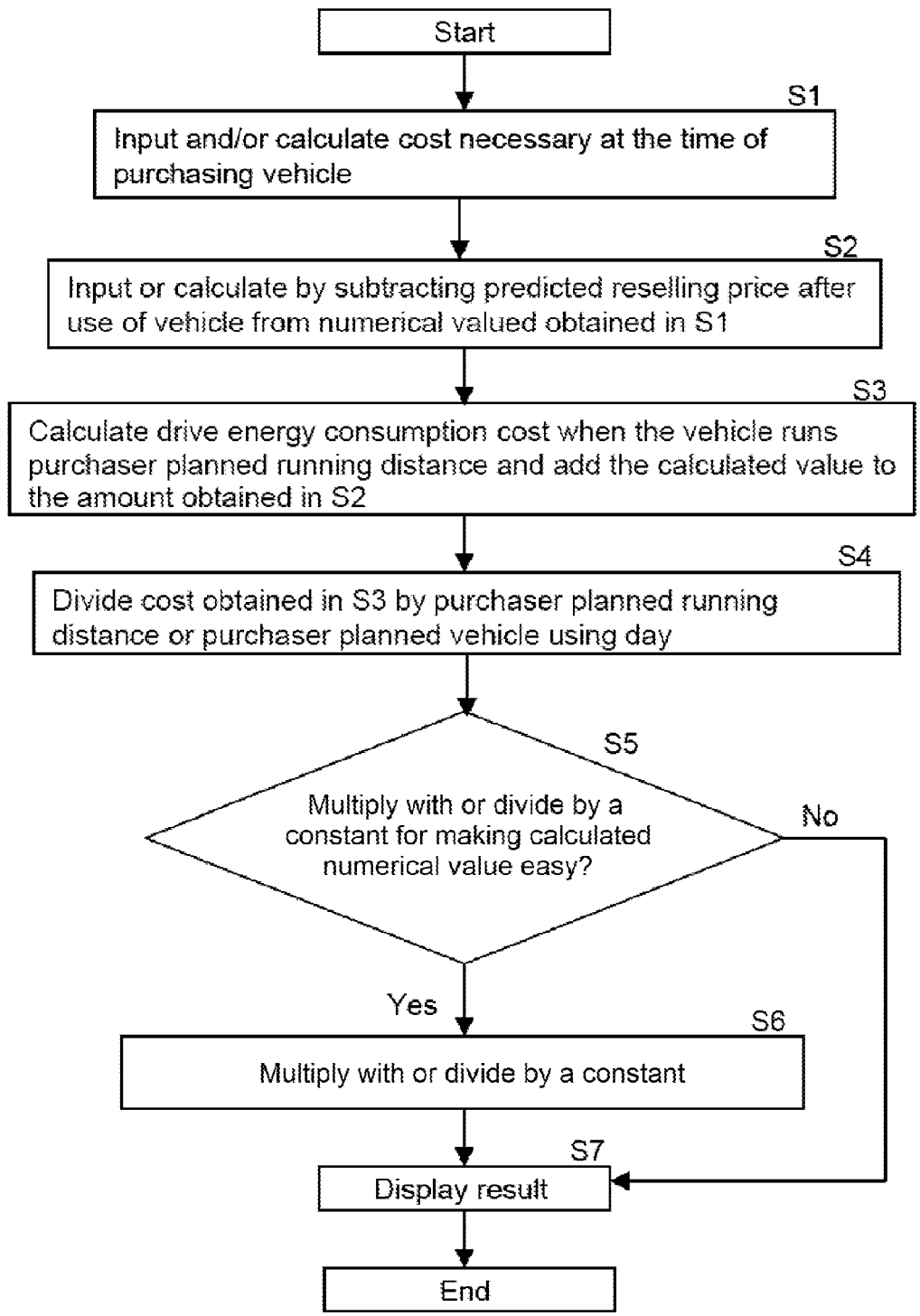
FIG. 3 is a flow chart for calculating an evaluation value by adding an energy consumption cost for planned vehicle using/running distance to a numerical value obtained by subtracting a predicted reselling price from a vehicle purchase cost, and by dividing thus obtained sum by the planned vehicle using/running distance. (Example 3)

A system, to which this invention is applied, in such a manner as illustrated in FIG. 3, is explained next. The flow of step 1 (S1) and step 2 (S2) of the system of FIG. 3 is the same as the flow of step 1 (S1) and step 2 (S2) of the system of FIG. 2 so that the explanation thereon is omitted.

Step 3 of FIG. 3 is configure in such a manner as to calculate a vehicle energy consumption cost in the case where a vehicle has run the vehicle running distance, which is planned by a purchaser (user) of the vehicle, and to add the calculated cost to the cost obtained in step 2.

The using/running distance of a vehicle, which is planned by the purchaser of the vehicle, is a numerical value of predicted using/running distance of a candidate vehicle to be newly purchased, as discussed previously. The planned vehicle using/running distance is configured to set by the purchaser of the vehicle, such as 20,000 km or 50,000 km, for example.

When the vehicle using/running distance planned by the purchaser of the vehicle is set in such a manner as described above, the vehicle drive energy consumption cost in the case where the vehicle has run the vehicle running distance planned by the purchaser of the vehicle can be calculated as a predicted value by using the fuel distance of the candidate vehicle for purchasing, and the drive energy unit price (for example, price per 1 liter of gasoline, in the case of a gasoline vehicle) of the vehicle at the time of calculation.

For example, the drive energy consumption cost is 325,000 (=50,000/20×130) yen, in the case where the vehicle has run the vehicle running distance planned by the purchaser of the vehicle, wherein the vehicle running distance planned by the purchaser of the vehicle is 50,000 km, the fuel efficiency thereof is 20 km/L, and the price of 1 liter of gasoline is 130 yen at the time of calculation, for example.

Accordingly, in the calculating portion up to step 3 of FIG. 3, if the cost in step 1 is 1,500,000 yen, the cost in step 2 is 500,000, the vehicle running distance planned by a purchaser (user) is 50,000 km, the fuel efficiency of the vehicle is 20 km/L and the price of 1 liter of gasoline at the time of calculation is 130 yen, for example, the calculation result up to step 3 of FIG. 3 is 1,325,000 (=1,500,000−500,000+325,000) yen (where 325,000 is previously led from 50,000/20×130).

Step 4 is configured in such a manner as to divide the numerical value obtained in step 3 by the vehicle using/running distance planned by the purchaser (user) or the number of vehicle using days planned by the purchaser.

In step 4, if the cost in step 1 is 1,500,000 yen, the cost in step 2 is 500,000 yen, and the vehicle running distance planned by the purchaser is 50,000 km, the fuel efficiency is 20 km/L, and the price of 1 liter of gasoline is 130 yen at the time of calculation, the abovementioned quotient is obtained by dividing the numerical value obtained in step 3 by 50,000 km, i.e., (1,500,000−500,000+325,000)/5000=26.5. This numerical value is obtained by dividing the numerical value, which is obtained by adding the initial cost at the time of purchasing and the running cost of the vehicle, by the planned vehicle running distance, and is effective as a numerical value for evaluating the cost effectiveness of the vehicle for purchasing. The calculating method of the evaluation numerical value can be regarded as the cost per km of running distance when the purchaser uses said vehicle.

In addition, in step 4, if the cost in step 1 is 1,500,000 yen, the cost in step 2 is 500,000 yen, and the vehicle running distance planned by the purchaser is 50,000 km, the fuel efficiency is 20 km/L, the vehicle using day planned by the purchaser is 2,000 days, and the price of 1 liter of gasoline is 130 yen at the time of calculation, the abovementioned quotient is obtained by dividing the numerical value obtained in step 3 by 2,000 days, i.e., (1,500,000−500,000+325,000)/2000=662.5. The calculating method of the evaluation numerical value can be regarded as the cost for moving per day when the purchaser uses said vehicle.

The steps after step 5 (S5) of FIG. 3 intend the same meaning and effect as those of the steps after step 3 (S3) of FIG. 1, the explanation on which is omitted here. Accordingly, it may be possible to skip step 5 (S5) and step 6 (S6) of FIG. 3, and go from step 4 (S4) to step 7 (S7). In addition, a system such as the system of FIG. 3, to which this invention is applied, may process steps 1-5 in a server apparatus, for example, and step 7 and start in a terminal apparatus connected to said server apparatus via a network, for example, in such a manner as the systems in FIG. 1 and FIG. 2.

Figure 4:
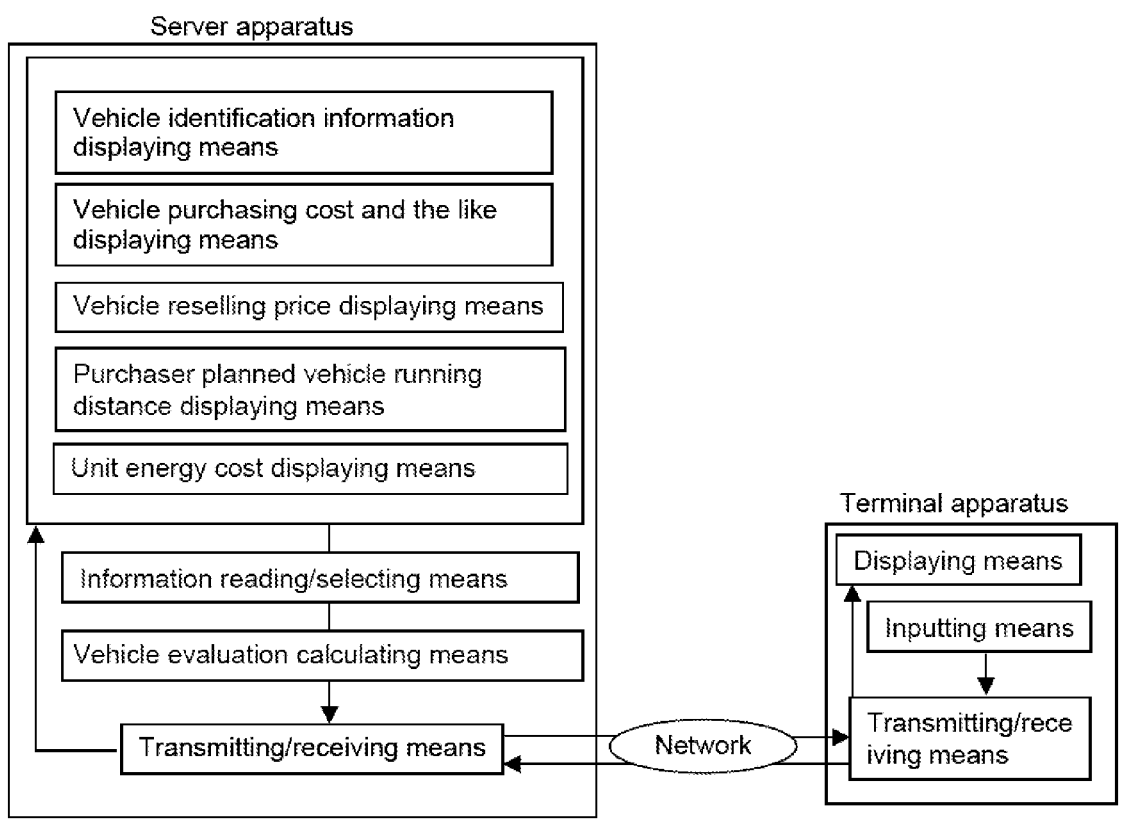
FIG. 4 is a system chart for calculating the evaluation value of a vehicle by the respective portion of a vehicle identification information displaying mean, a vehicle purchasing cost and the like displaying portion, a purchaser planned vehicle running distance displaying portion, a vehicle reselling price calculating portion, a purchaser planned vehicle running distance displaying portion, a vehicle reselling price displaying portion, a unit energy cost displaying portion, an information reading/selecting portion, a vehicle evaluation calculating portion, and a displaying portion.

A system such as the system of FIG. 4, to which this invention is applied, is explained next. The vehicle identification information displaying portion is configured in such a manner that the vehicle identification information on each of a plurality of vehicles of respective vehicle manufacturers, such as model, type, vehicle type, vehicle weight, displacement, category, fuel efficiency, weight tax, and acquisition tax, is memorized or inputted by a purchaser (user) in said portion. The weight tax, replacement, category and the like, which are considered to be unnecessary for, in particular, comparing the cost effectiveness with other candidate vehicles for purchasing, are allowed to miss. The structure of an apparatus for storing information in the vehicle identification information displaying portion is configured with, for examples, memory media such as, hard disk drive, CD-ROM, DVD-ROM and BD-ROM, memories and the like. The storage method therein is configured in such a manner as to describe and store information as a table format. The information, for example, on a plurality of vehicles of the respective vehicle manufacturers to be stored in the vehicle identification information displaying portion may be configured in such a manner as to be designed and set based on the information that the respective vehicle manufacturers publish, based on the specification of Ministry of Land, Infrastructure, Transport and Tourism (MLIT).

The information to be memorized or inputted in the vehicle identification displaying portion is configured in such a manner as to be read and selected, or inputted and selected in a timely and sequential manner, as an element for calculating an evaluation value of the vehicle, by an information reading/selecting portion to be described below. In addition, the information reading/selecting portion to be described below is configured in such a manner as to have, for example, a text retrieval function and a voice retrieval function, and retrieve, read and select vehicle identification information from the vehicle identification information displaying portion in which the vehicle identification information is memorized as a database, by the action of a user to input the model, type and vehicle type of a vehicle to examine to the information reading/selecting portion to be described below.

A vehicle purchasing cost and the like displaying portion is configured in such a manner that the price of each of the plurality of vehicles of the respective vehicle manufactures, the cost for purchasing each of the plurality of vehicles, or the cost (hereinafter referred to as "cost for purchasing vehicle and the like") obtained by adding the cost for maintaining (excluding drive energy consumption cost) each of the plurality of vehicles, is memorized or inputted by a purchaser. The cost for purchasing vehicle and the like is as mentioned above. The vehicle purchasing cost and the like displaying portion is configured with, for example, the abovementioned memory media and memories when storing the cost for purchasing vehicle and the like.

In addition, when each of the vehicle identification information displaying portion and the vehicle purchasing cost and the like displaying portion stores each piece of information in each portion, the pieces of information of the same vehicle among the plurality of vehicles of the respective vehicle manufacturers are configured in such a manner as to be mutually linked information. In other words, for example, the items, such as the model, type, vehicle model of the vehicle identified by and stored in the vehicle identification information displaying portion, and one or plurality items, such as a unique identification number set for each vehicle, are configured in such a manner as to be contained in the information on the same vehicle in the vehicle purchasing cost and the like displaying portion, wherein the information in the vehicle identification information displaying portion, and the information in the vehicle purchasing cost and the like displaying portion can be linked as a database. Accordingly, when vehicle identification information on one vehicle is retrieved and read from the vehicle identification information displaying portion by the information reading/selecting portion to be described below, for example, the cost for purchasing vehicle and the like of the same vehicle as the one vehicle may be configured in such a manner as to be simultaneously read from or generated by the vehicle purchasing cost and the like displaying portion, by the information reading/selecting portion to be described below.

Furthermore, in the information in the vehicle identification information displaying portion and the information in the vehicle purchasing cost and the like displaying portion, for example, multiple pieces of information on the same vehicle among the plurality of vehicles of the respective vehicle manufacturers can be linked as a hyperlink structure in items, such as vehicle model and unique identification number, in the information on said same vehicle.

Moreover, in the information in the vehicle identification information displaying portion and the information in the vehicle purchasing cost and the like displaying portion, information on the same vehicle among the plurality of vehicles of the respective vehicle manufacturers may be configured in such a manner as to be programmed in advance using a programming language such as CGI (Common Gateway Interface), PHP (Hypertext Preprocessor) and JavaScript, in order to be simultaneously called as linked associated information. Note that, in the information in the vehicle identification information displaying portion and the information in the vehicle purchasing cost and the like displaying portion, the method for generating linked information from multiple pieces of information on the same vehicle among the plurality of vehicles of the respective vehicle manufacturers is not limited to the method mentioned here. In addition, in the "linked" relationship of vehicle identification information displaying portion with the vehicle purchasing cost and the like displaying portion, the cost for purchasing vehicle and the like stored in the vehicle purchasing cost and the like displaying portion may be stored in the vehicle purchasing cost and the like displaying portion as part of the information thereof.

The purchaser planned vehicle running distance displaying portion is configured in such a manner that a purchaser planned vehicle running distance is memorized, memorized and calculated, or inputted therein. Here, an example in which a purchaser planned vehicle running distance is stored in a storage of a purchaser planned vehicle running distance displaying portion, is configured in such a manner as to set and store 1,000 km as the minimum numerical value, set and memorize numerical values obtained by extending said distance by 100 km in sequence in the storage unit, and set and memorize 100,000 km as the maximum numerical value, for example. The purchaser planned vehicle running distance displaying portion may also be configured in such a manner that a purchaser can read and select a numerical value memorized in the memory unit from said portion, by a pull-down displaying method in a hyper text markup language (html) format, for example. The minimum value, values obtained by extending the distance in sequence, and maximum value are not limited to the values disclosed here. When the purchaser planned vehicle running distance displaying portion memorizes, or memorizes and calculates, as described above, the structure of an apparatus for memorizing is configured with the abovementioned memory media and memories.

In addition, the purchaser planned vehicle running distance displaying portion may be a portion for, for example: memorizing a plurality of planned average running distances per day in a memory unit; reading/selecting one planned average running distance per day among the plurality of planned average running distances per day from the memory unit by the information reading/selecting portion to be described below, while memorizing a plurality of planned using days of a vehicle (hereinafter referred to as "multiple planned vehicle using day numbers") during the time from a purchasing time to a reselling time (time when reselling a vehicle to a third party); and calculating a planned running distance by multiplying the average running distance per day with the one number of planned vehicle using day, based on the feature of reading/selecting one number of planned vehicle using day from the memory unit in which the multiple planned vehicle using day numbers are memorized by the information reading/selecting portion to be described below. The method or program in the abovementioned calculating portion is configured with, for example, an arithmetic processing unit, such as a central processing unit (CPU) in a computer, and C++, CGI or JavaScript is used as a process requesting language. Note that said method or program may not be a particularly limited method, language or program. In addition, the memorizing method of a purchaser planned vehicle running distance is not limited to the method mentioned here. Furthermore, a purchaser may input a purchaser planned vehicle running distance that is planned by the purchaser.

A vehicle reselling price displaying portion is configured in such a manner as to memorize and/or calculate, or to be inputted by a purchaser, the predicted vehicle reselling price of a candidate vehicle for the purchaser to purchase. The vehicle reselling price displaying portion may be configured in such a manner as to calculate a vehicle reselling price, for example, based on information in the vehicle identification information displaying portion, vehicle purchase cost and the like displaying portion, and purchaser planned vehicle running distance displaying portion, by functioning in conjunction with said information. In other words, the vehicle reselling price displaying portion may be configured in such a manner that, for example: when a purchaser performs a text retrieval using the model of a candidate vehicle for newly purchasing from a vehicle identification information displaying portion by the information reading/selecting portion to be described below, the vehicle model as well as the type of thus selected candidate vehicle for purchasing, vehicle type (manufacturing date is distinguishable from said information) are read from the vehicle identification information displaying portion, and when said information is displayed on the displaying portion to be described below, the cost for purchasing vehicle and the like is read/selected simultaneously from the vehicle purchasing cost and the like displaying portion that is configured to be connected to the vehicle identification information displaying portion, by the information reading/selecting portion to be described below, and to be displayed on the displaying portion to be described below; the purchaser planned vehicle running distance, which the purchaser has inputted, or selected and/or calculated, from the purchaser planned vehicle running distance displaying portion, is displayed on the displaying portion to be described below; the vehicle reselling price displaying portion calculates the reselling price of the called/selected candidate vehicle, based on said read or inputted multiple pieces of information. Here, the method or program for said calculation is CGI, JavaScript or the like, for example, but may not be a particularly limited method or program.

In the case where the vehicle reselling price displaying portion memorizes a vehicle reselling price, the structure of an apparatus for memorizing is configured with, for examples, the abovementioned memory media and memories.

The abovementioned vehicle reselling price displaying portion may be configured in such a manner as to memorize one or more coefficients for calculating a predicted vehicle reselling price, as an example of a method for "calculating a reselling price of a candidate vehicle". In other words, the vehicle reselling price displaying portion may be configured in such a manner as to, when obtaining a reselling price after use of said vehicle using the cost for purchasing vehicle and the like of the candidate vehicle for purchasing, for example: calculate a difference based on the manufacturing date of the type of the vehicle, which is read from the vehicle identification information displaying portion, the purchasing date of the vehicle planned by the purchaser, and the owning dates of the vehicle planned by the purchaser; set the calculated difference as the type coefficient thereof; and set a running distance coefficient in advance based on a planned running distance. More specifically, the vehicle reselling price displaying portion is configured in such a manner as to calculate a predicted vehicle reselling price after use of a candidate vehicle for purchasing, by multiplying or dividing, for example, the cost for purchasing vehicle and the like of said candidate vehicle for purchasing, with or by the type coefficient and running distance coefficient that are set in advance, for example.

The running distance coefficient is configured in such a manner that a coefficient is set, with which the longer the planned running distance of the candidate vehicle for purchasing is, the lower the reselling price thereof is. In addition, the type coefficient may be configured in such a manner as to be derived from the difference between the manufacturing date of a candidate vehicle for purchasing and the number of planned using days of said candidate vehicle for purchasing, for example, and in such a manner that a coefficient is set, with which the larger the difference is, the lower the reselling price.

In addition, the vehicle reselling price displaying portion may be configured in such a manner that a popularity coefficient is set therein, by which, when calculating vehicle reselling prices of multiple candidate vehicles for purchasing under the condition in which the prices and purchaser planned vehicle running distances are the same, the vehicle reselling price of a vehicle with more popular vehicle model is set higher than those of vehicles with not popular vehicle model.

Furthermore, when calculating a vehicle reselling price of a candidate vehicle for purchasing, it is also possible for a purchaser to input the utilization method (commuting, leisure, transportation, commercial and the like) of the candidate vehicle for purchasing, thereby calculating a reselling price of the vehicle, in consideration of said inputted information.

In other words, it is supposed that, when a vehicle is used for transportation and/or commercial, for example, the vehicle wears and tears rapidly; therefore, it is possible to configure in such a manner that the reselling price of said vehicle is set to be lower than the reselling price of a vehicle that is used for commuting and/or leisure. In addition, it may be configured in such a manner as to set the utilization method (commuting, leisure, transportation, commercial and the like) of the vehicle, as a utilization method coefficient.

In addition, the vehicle reselling price displaying portion may link a reselling price calculation portion that a third party serves, and show a vehicle reselling price according to inputted model and type of a vehicle. Furthermore, it may be possible for a purchaser to input a vehicle reselling price in the vehicle reselling price displaying portion. Note that the method for memorizing and/or calculating, or inputting a predicted vehicle reselling price of a candidate vehicle for purchasing by a purchaser is not limited to the method mentioned here.

A unit energy cost displaying portion is configured in such a manner that the consumption costs (cost per 1 liter of a fuel such as gasoline, ethanol and hydrogen, or a cost per kWh of electricity, when a fuel efficiency is expressed in km/L, km/kWh or the like, respectively) per certain unit of drive energy of a plurality of vehicles of the respective vehicle manufacturers are memorized or inputted by a purchaser. In other words, the unit energy cost displaying portion is configured in such a manner that, when memorizing the consumption cost in the case where the fuel efficiency of a gasoline vehicle is represented by 20 km/L, for example, the value of the current price of 1 liter of gasoline is memorized. Furthermore, said unit energy cost displaying portion may be configured in such a manner as to be read or generated as information linked to the vehicle identification information displaying portion. An example of manner to link said unit energy cost displaying portion with the vehicle identification information displaying portion is as provided as the example of manner to link information in the vehicle identification information displaying portion with information in the vehicle purchase cost and the like displaying portion.

The cost per certain unit of drive energy representing the fuel efficiency, which is memorized in the unit energy cost displaying portion, is a current price or an average cost for past several years, for example, per certain unit of gasoline, electricity, gas, hydrogen, ethanol or the like, regardless of the kind of the drive energy. The unit energy cost displaying portion is configured in such a manner to be constituted with memory media and memories, such as hard disk drive, CD-ROM, DVD-ROM and BD-ROM, for example.

The information reading/selecting portion is configured in such a manner as to read/select or generate information, in a timely manner, from the respective vehicle identification information displaying portion, vehicle purchase cost and the like displaying portion, purchaser planned vehicle running distance displaying portion, vehicle reselling price displaying portion, and unit energy cost displaying portion, or to select information inputted by a purchaser. In other words, the information reading/selecting portion is configured in such a manner as to read/select or generate information, or select information inputted by the purchaser, in order to calculate an evaluation index of a vehicle in the vehicle evaluation calculating portion to be described below. There are pieces of information which the information reading/selecting portion is configured in such a manner as to read or generate and select from the abovementioned respective portion, and which are memorized as mutually linked databases, such as a relational database described in Structured Query Language (SQL), for example. The pieces of information linked and memorized in such a manner may be configured in such a manner as to, when said information reading/selecting portion reads/selects one piece of information, be simultaneously read or generated and selected. The information reading/selecting portion is configured in such a manner as to comprise a retrieval function such as a text retrieval function and a voice retrieval function, for example, and to be capable of reading vehicle identification information of a vehicle wanted by a purchaser from the vehicle identification displaying portion, by the purchaser's inputting a vehicle model of the vehicle which the purchaser wants to purchase.

A displaying portion is configured in such a manner as to comprise, for example, a display and/or a speaker, and display information and an image that the information reading/selecting portion has selected, a text that a purchaser has inputted, or an image and voice such as web information and utilization guidance. The displaying portion may comprise a portion for temporarily memorizing, in a flash memory and the like, the information displayed on said displaying portion. In addition, each of the vehicle identification displaying portion, vehicle purchase cost and the like displaying portion, purchaser planned vehicle running distance displaying portion, vehicle reselling price displaying portion, unit energy cost displaying portion, information reading/selecting portion, vehicle evaluation calculating portion to be described below, may be configured in such a manner as to be, as a server apparatus for calculating/processing the evaluation of a vehicle, separated from said displaying portion, wherein the server apparatus may be configured in such a manner as to be connected to a terminal apparatus having said displaying portion in order to transmit/receive information via a network such as the Internet. In this case, the terminal apparatus comprising said displaying portion is configured in such a manner as to be connected to the server apparatus via the network, wherein:

in the case where there is information to input to said terminal apparatus, the information is inputted in said terminal apparatus and transmitted by a transmitting portion of said terminal apparatus to a server apparatus; a receiving portion of the server apparatus receives the transmitted information; the server apparatus calculates an evaluation index of a vehicle by the vehicle evaluation calculating portion to be described below in the server apparatus, based on the information inputted in said terminal apparatus and/or the information read/selected by the information reading/selecting portion, and transmits the calculated information to said terminal apparatus via the network, using a transmitting portion of the server apparatus; and a receiving portion of said terminal apparatus receives the information and displays said information on the displaying portion.

The vehicle evaluation calculating portion is configured in such a manner as to calculate an evaluation index such as that disclosed in embodiment 3 with respect to the cost effectiveness of a vehicle, based on the information which is read/selected by the information reading/selecting portion and/or the information which is inputted by a purchaser. The vehicle evaluation calculating portion is configured with an arithmetic processing unit such as a CPU of a computer, for example, and instructions and programs for performing the abovementioned calculation can be constructed by C++, CGI, JavaScript and the like, for example. Note that the instructing method or program may not be a particularly limited method or program. In addition, the vehicle evaluation calculating portion may have a portion for temporarily memorizing each piece of the information which is read/selected by the information reading/selecting portion and or the information which is inputted by the purchaser.

The specific flow for calculating an vehicle evaluation in the vehicle evaluation portion is configured in such a manner that, in the case where the fuel efficiency of a candidate vehicle for purchasing is represented as 20 km/L by a purchaser's identification of the candidate vehicle for purchasing in the vehicle identification information displaying portion; the cost for purchasing vehicle and the like of said candidate vehicle for purchasing is represented as 1,500,000 yen by the vehicle purchase cost and the like displaying portion; the purchaser planned vehicle running distance of said candidate vehicle for purchasing is represented as 50,000 km by the purchaser planned vehicle running distance displaying portion; the predicted reselling price after use of said candidate vehicle for purchasing is represented as 500,000 by the vehicle reselling price displaying portion; and the price of gasoline at the time of calculation is represented as 130 yen per liter by the unit energy cost displaying portion, for example, the vehicle evaluation calculating portion calculates the evaluation as 26.5 (=(50,000 [km]/20 [km/L]×130 [yen]+1,5000,000−500,000)/50,000 [km]), for example.

The vehicle evaluation system of the eleventh invention of the present application is explained next. The "vehicle having an electricity storing section capable of being charged as needed" is a vehicle having an electricity storing section capable of storing electric energy by charging electric energy, and of being used as a battery (so-called secondary battery).

Said electricity storing section is configured with, for example, a lead battery and a lithium secondary battery. However, the configuration of the electricity storing section is not limited to the abovementioned configuration.

The vehicle identification displaying portion is configured in such a manner as to memorize or input multiple pieces of vehicle identification information, such as the model, type, vehicle type, fuel efficiency, weight tax, acquisition tax, vehicle electricity storage amount, and charging time necessary for filling the vehicle electricity storage amount with electric energy (hereinafter referred to as "vehicle electricity storage amount charging time") of each of the plurality of vehicles. Here, the vehicle electricity storage amount of a vehicle is a maximum amount of electric energy, to which electric energy can be charged into the electricity storing section. Said electricity storage amount is usually expressed in the unit of kWh. Note that the electric energy chargeable into the electricity storing section of a Japanese vehicle currently corresponds to a format such as AC 100V (15 A) and AC 200V (15 A), but any format is applicable. The vehicle electricity storage amount and the vehicle electricity storage amount charging time are used for calculation of earning that is obtained by a vehicle purchaser when electric energy is charged and stored in said vehicle, and thus stored electric energy is used for other than driving the vehicle. Note that the explanation on "memorizing or inputting" is configured in such a manner as to be the same as the explanations on the other aforementioned portion.

A purchaser planned vehicle owning year information displaying portion is configured in such a manner as to memorize or be inputted by a purchaser, a vehicle owning year (hereinafter referred to as "purchaser planned vehicle owning year information") planned by the purchaser. The purchaser planned vehicle owning year information is planned owning year information of a vehicle from the time when a purchaser purchases the vehicle to the time when the purchaser releases (scraps or resells, for example) the vehicle. When a purchaser planned vehicle owning year information displaying portion memorizes a purchaser planned vehicle owning year as above, a numerical value may be selected from 2-99, as appropriate, where the minimum value is set to be 1 and the maximum value is set to be 100. The purchaser (user) can use the purchaser planned vehicle owning year information displaying portion in a pull-down format such as an html format. Note that a method for setting the plurality of the numbers of vehicle owning years is not limited to the method described here.

A purchaser planned vehicle non-using day information displaying portion is configured in such a manner as to memorize or be inputted a purchaser planned non-running/using day (hereinafter referred to as "purchaser planned vehicle non-using day information") of the vehicle, which is planned by the purchaser of the vehicle. The non-running/using day of said vehicle is the number of planned non-running/using days of the vehicle from the time when a purchaser purchases the vehicle to the time when the purchaser releases (scraps or resells, for example) the vehicle. In other words, the non-running/using day is the number of days when the vehicle is not used for going somewhere, and said number of days represents the number of days when the electric energy charged and stored in an electricity storing section in said vehicle can be used for other than running the vehicle. The idea that the purchaser planned vehicle non-using day information displaying portion memorizes the purchaser planned vehicle non-using day information or said information is inputted to said portion, and the configuration necessary for processing said information by said portion, are the same as the idea and configuration of the purchaser planned vehicle running distance displaying portion. The purchaser planned vehicle non-using day information displaying portion is configured in such a manner as to, in the case of memorizing the abovementioned information, set and memorize a plurality of days in one month, in which a purchaser does not use a vehicle for running. As a method for setting the plurality of using days, a numerical value may be selected from 2-29, as appropriate, where the minimum value is set to be 1 and the maximum value is set to be 30 (or everyday). Note that: a method for setting the plurality of using days is not limited to the method described here. It is possible to calculate purchaser planned vehicle non-using day information by multiplying the number of days in one month, in which a vehicle is not used for running, with the purchaser planned vehicle owning year information, and multiplying thus obtained numerical value with 12 (for one year).

An electricity charge system information displaying portion is configured in such a manner as to memorize or be inputted electricity charge systems in areas different from one another, or electricity charge systems in service forms different from one another, for example. Said electricity charge system information displaying portion is configured in such a manner as to memorize or be inputted, with respect to electricity (electric energy) supplied from an electricity supply company, electricity charge system information in which an electricity charge at a low charge time such as nighttime charge (expressed in the unit of kWh, hereinafter referred to as "a low electricity charge"), and an electricity charge at a high charge time such as daytime charge (expressed in the unit of kWh, hereinafter referred to as "a high electricity charge") are specified. Note that, even in the case where the abovementioned electricity charge system information does not specify the low electricity charge and high electricity charge, for example, even when the charge system is constant regardless of the conditions of use of electricity, the role of the electricity charge system information displaying portion does not change. In this case, it is possible to set a constant electricity charge in correspondence with the low electricity charge and high electricity charge.

A purchaser electricity consumption information displaying portion is configured in such a manner as to memorize or be inputted purchaser electricity consumption information, which represents electricity consumption of the purchaser of the vehicle in the electricity charge system during a certain period of time, and represents: using time at a low electricity charge time (hereinafter referred to as "low charge electricity using time") in the electricity charge system information, and the electricity consumption therein (hereinafter referred to as "low charge electricity consumption"); using time at a high electricity charge time (hereinafter referred to as "high charge electricity using time") in the electricity charge system information, and the electricity consumption therein (hereinafter referred to as "high charge electricity consumption"); a purchaser total electricity using time, which is the total of the time of using low charge electricity and the time of using high charge electricity; and a purchaser total electricity consumption, which is the total of low charge electricity consumption and high charge electricity consumption. Memorizing the electricity consumption may be memorizing, in the abovementioned memory media, an average consumption of electricity of Japanese families for one month or one year, for example, or setting the minimum value and maximum value of electricity, to set a numerical value therebetween. In addition, the purchaser may input an average consumption of electricity for one month or one year, referring to the purchaser's housekeeping book, for example.

A unit electricity buying price information displaying portion is configured in such a manner as to memorize or be inputted an electricity buying price (hereinafter referred to as "unit electricity buying price information") per unit (1 kWh) of an electricity buying company when the electricity buying company buys electricity from a third party. In the Japanese system today, the electricity supply company is generally identical to the electricity buying company. The electricity that the electricity company buys from a third party is generated by the third party using natural energy, such as solar energy, or using a private electric generator. The electricity buying price per unit (1 kWh) is set to be 40 yen per kWh, for example.

An electricity company electricity chargeable time information displaying portion is configured, in the case where a purchaser of a vehicle charges electric energy to be used for other than running said vehicle, from the electricity company to an electricity storing section of said vehicle, in such a manner as to memorize or be inputted: the chargeable time in the low electricity charge time (hereinafter referred to as "low charge electricity charging time information"); the chargeable time in the high electricity charge time (hereinafter referred to as "high charge electricity charging time information"); and a chargeable time of electricity from the electricity company (where the chargeable time ≤ the vehicle electricity storage amount charging time, hereinafter referred to as "electricity company electricity chargeable time information"), which is the total of the low charge electricity charging time information and high charge electricity charging time information. What is meant by that the electricity company electricity chargeable time information displaying portion memorizes electricity company electricity chargeable time information, is that the electricity company electricity chargeable time information displaying portion can set and memorize, as appropriate, a numerical value between a minimum value of 0 or 1, and a maximum value of 8, when it is found that the electricity storing section of the vehicle is full-charged for 8 hours using domestic power supply (100V, 15 A), for example, from the vehicle electricity storage amount charging time.

An electricity supply apparatus chargeable time information displaying portion is configured in such a manner that the purchaser of the vehicle memorizes or inputs chargeable time (hereinafter referred to as "electricity supply apparatus chargeable time information", where the chargeable time ≤ the vehicle electricity storage amount charging time) of electric energy from an electricity supply apparatus (natural energy power generation apparatus, fuel cell, private electric generator and the like) other than the electricity company to the electricity storing section of said vehicle. The power supply apparatus other than the electricity company is not limited to natural energy power generation apparatus, fuel cell, private electric generator, which are listed here, but may be any other power generation apparatus or electricity supply apparatus. Also in the case where the electricity supply apparatus chargeable time information displaying portion memorizes the electricity supply apparatus chargeable time information, said information can be set and memorized, as is the case with the electricity company electricity chargeable time information displaying portion.

An information reading/selecting portion is configured in such a manner as to read/select memorized information or select inputted information, said memorized information or inputted information being memorized or inputted by the respective vehicle identification information displaying portion, purchaser planned vehicle owning year information displaying mean, purchaser planned vehicle non-using day information displaying portion, electricity charge system information displaying portion, purchaser electricity consumption information displaying portion, unit electricity buying price information displaying portion, electricity company electricity chargeable time information displaying portion, and electricity supply apparatus chargeable time information displaying portion, according to whether said information is memorized or inputted in the abovementioned respective portion. In addition, the information reading/selecting portion may be configured in such a manner as to be constituted with a text retrieval function and a voice retrieval function, and reads/selects the memorized information mentioned above.

A stored electric energy using/selling earning information calculating portion is configured in such a manner as to use, in combination, any of the purchaser planned vehicle owning year information, the purchaser planned vehicle non-using day information, the electricity charge system information, the purchaser electricity consumption information, the unit electricity buying price information, the electricity company electricity chargeable time information and the electricity supply apparatus chargeable time information, among information (hereinafter referred to as "information reading/selecting portion selection information") for reading/selecting the information memorized by the information reading/selecting portion of the information inputted therein, thereby calculating earning (hereinafter referred to as "stored electric energy using/selling earning") obtained by charging and storing electric energy supplied from the electricity supply company and/or electric energy supplied from an electric energy supply apparatus other than the electricity supplied from the electricity supply company, and using the electric energy stored in the electricity storing section, as electric energy for family use or for industrial use of the vehicle purchaser and/or selling said electric energy to the electricity buying company. The stored electric energy using/selling earning information calculating portion is constituted with an arithmetic processing unit such as a CPU.

A command and a program for the abovementioned calculation can be constructed by C++, CGI, JavaScript and the like. Meanwhile, the abovementioned command method or program may not be a specifically limited method or program. Note that, with respect to "using, in combination, any of information", a calculating portion is described in claim 11, for example.

Major cases, each of which generates earning to be obtained as the stored electric energy using/selling earning information, are presented below. Case 1: Earning is obtained by charging and storing electric energy from an electricity supply company into an electricity storing section of a vehicle and using stored electric energy as electric energy for family use or for industrial use. Case 2: Earning is obtained by charging and storing electric energy from an electricity supply company into an electricity storing section of a vehicle and selling stored electric energy to an electricity buying company. Case 3: Earning is obtained by charging and storing electric energy from an external electricity storage apparatus into an electricity storing section of a vehicle and using stored electric energy as electric energy for family use or for industrial use. Case 4: Earning is obtained by charging and storing electric energy from an external electricity storage apparatus and selling stored electric energy to an electricity buying company. Case 5: Earning is obtained by charging and storing electric energy from an electricity supply company and an external electricity storage apparatus into an electricity storing section of a vehicle and using stored electric energy as electric energy for family use or for industrial use. Case 6: Earning is obtained by charging and storing electric energy from an electricity supply company and an external electricity storage apparatus into an electricity storing section of a vehicle and selling stored electric energy to an electricity buying company. Note that a case in which the abovementioned stored electric energy using/selling earning information is obtained is not limited to the cases provided here.

A displaying portion is configured in such a manner as to display in a timely and sequential manner the information reading/selecting portion election information and the stored electric energy using/selling earning information calculated by the stored electric energy using/selling earning information calculating portion. The displaying portion is constituted with a display, a speaker and the like, for example, and is configured in such a manner as to display information and images read by the information reading/selecting portion, characters inputted by a purchaser, and images and voices such as web information and utilization guidance. The displaying portion may comprise a portion for temporarily memorizing information displayed on said displaying portion in a flash memory or the like. In addition, each of the vehicle identification information displaying portion, the purchaser planned vehicle owning year information displaying portion, the purchaser planned vehicle non-using day information displaying portion, the electricity charge system information displaying portion, the purchaser electricity consumption information displaying portion, the unit electricity buying price information displaying portion, the electricity company electricity chargeable time information displaying portion, the electricity supply apparatus chargeable time information displaying portion, the information reading/selecting portion, and the stored electric energy using/selling earning information calculating portion may be configured in such a manner as to be an apparatus separated from said displaying portion as a server apparatus for calculating/processing evaluation of a vehicle, and in such a manner that the server apparatus is connected to a terminal apparatus comprising said displaying portion, so as to be capable of transmitting/receiving information therewith via a network such as the Internet. In this case, said terminal apparatus comprising the displaying portion is configured in such a manner that: the terminal apparatus is connected to the server apparatus via the network; in the case where information to input to said terminal apparatus is present, the information is inputted to said terminal apparatus, and transmitted to a server apparatus by the transmitting portion of said terminal apparatus; the transmitted information is received by the receiving portion of the server apparatus; the server apparatus calculates an evaluation index of a vehicle by the stored electric energy using/selling earning information calculating portion in the server apparatus, based on the information that is inputted by the terminal apparatus and/or the information that is read/selected by the information reading/selecting portion; the calculated information is transmitted to said terminal apparatus via the network by the transmitting portion of the server apparatus; and said information is received by the receiving portion of said terminal apparatus, and is displayed by the displaying portion thereof.

Figure 5:
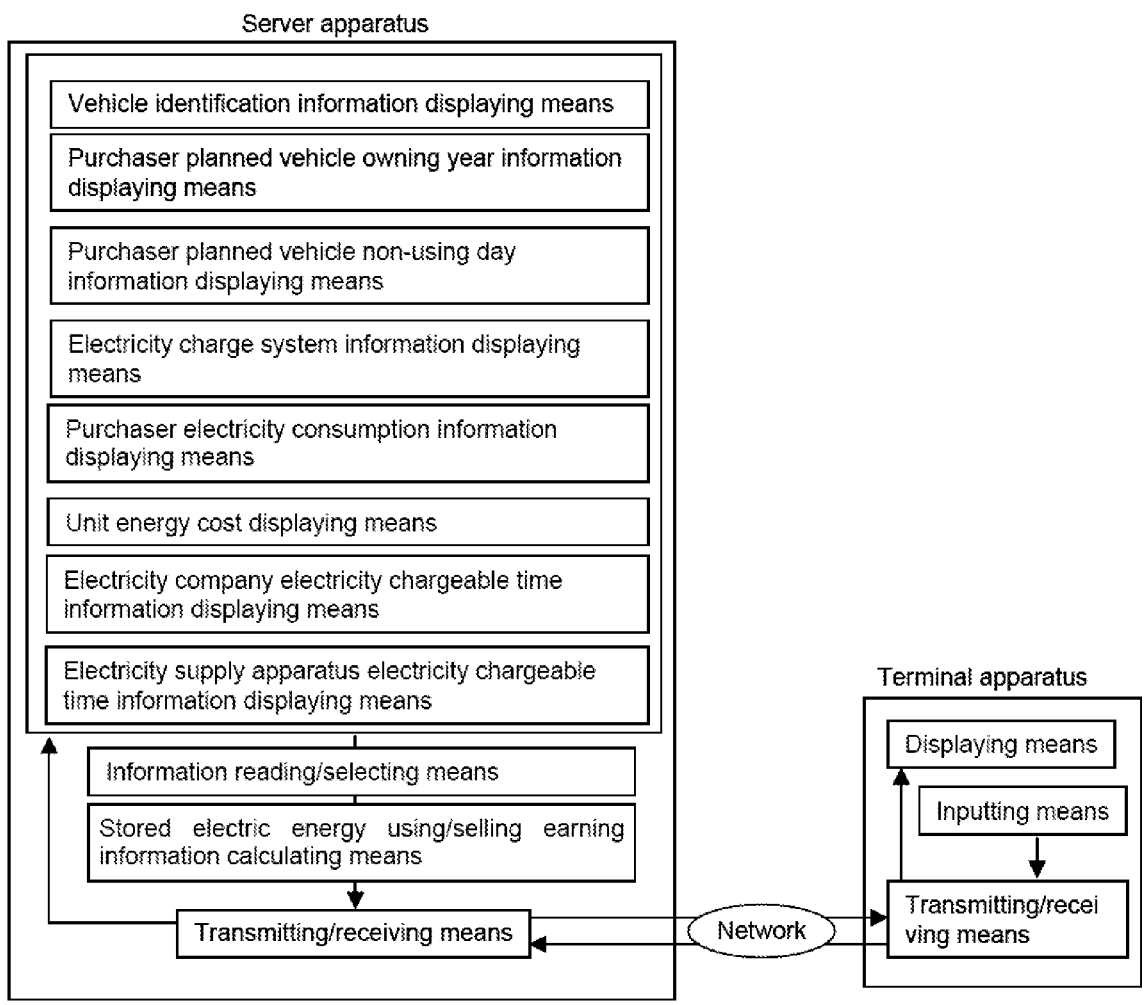
FIG. 5 is a system chart for calculating the evaluation value of a vehicle by the respective vehicle identification information displaying mean, purchaser planned vehicle owning-year information displaying portion, purchaser planned vehicle non-using day information displaying portion, electricity charge system information displaying portion, unit electricity buying price information displaying portion, electricity company electricity chargeable time information displaying portion, electricity supply apparatus chargeable time information displaying portion, information reading/selecting portion, stored electric energy using/selling earning information calculating portion, and displaying portion.
Figure 6:
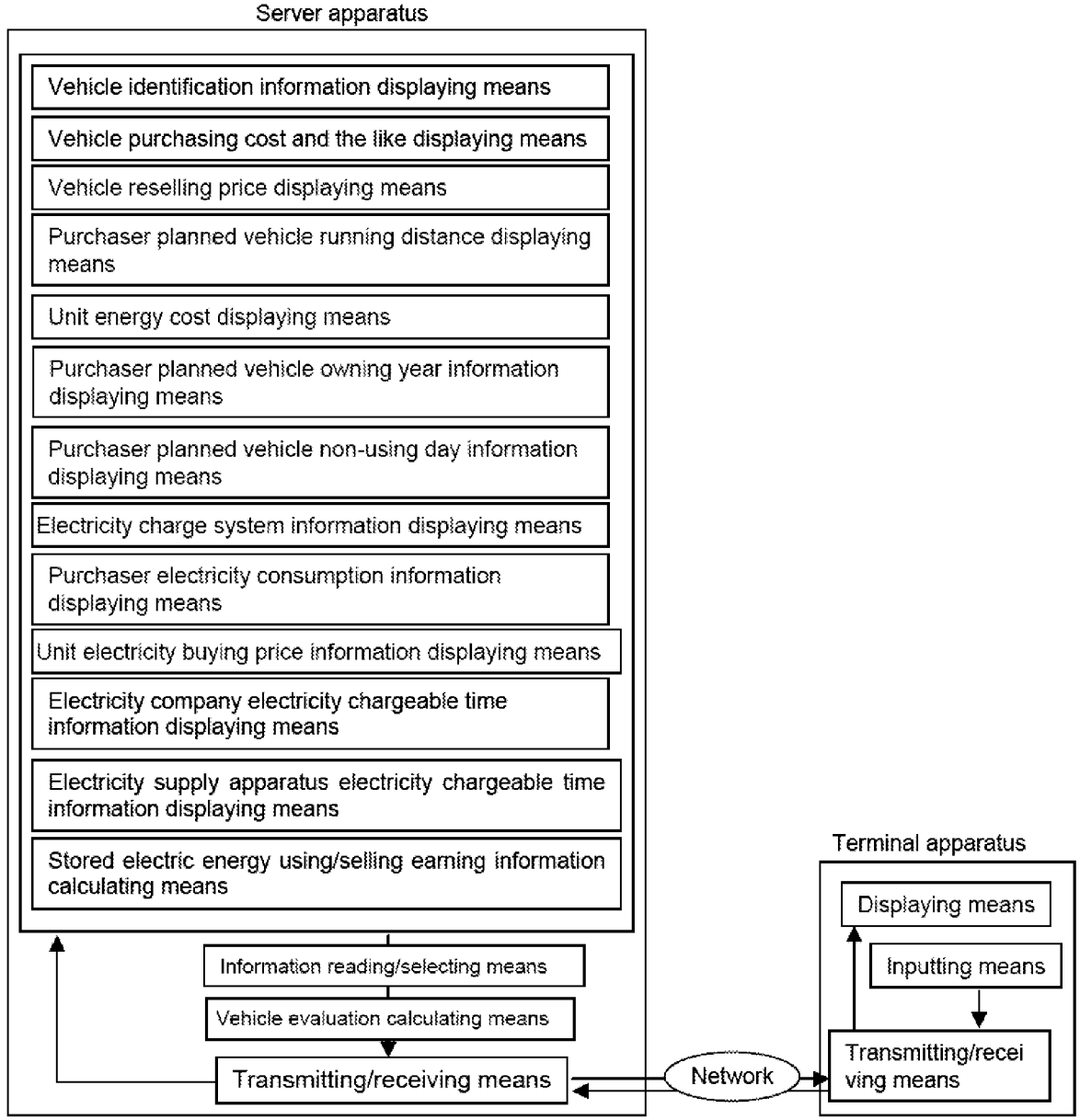
FIG. 6 is a system chart for calculating the evaluation value of a vehicle by the respective vehicle identification information displaying mean, purchaser planned vehicle running distance displaying portion, purchaser planned vehicle running distance displaying portion, vehicle reselling price displaying portion, unit energy cost displaying portion, vehicle evaluation calculating portion, purchaser planned vehicle owning-year information displaying portion, purchaser planned vehicle non-using day information displaying portion, electricity charge system information displaying portion, purchaser electricity consumption information displaying portion, unit electricity buying price information displaying portion, electricity company electricity chargeable time information displaying portion, electricity supply apparatus chargeable time information displaying portion, information reading/selecting portion, stored electric energy using/selling earning information calculating portion, vehicle evaluation calculating portion, and displaying portion.

Next, an example is specifically disclosed, which explains how the stored electric energy using/selling earning information calculating portion calculates earning in the vehicle evaluation system (see FIG. 5) by the eleventh invention of the present application, in the abovementioned "case 1: earning is obtained by charging and storing electric energy from an electricity supply company into an electricity storing section of a vehicle and using stored electric energy as electric energy for family use or for industrial use". Here, the maximum earning is obtained in the case where a vehicle purchaser charges and stores electricity in the low electricity charge time in the electricity charge system of the region where the purchaser lives, into an electricity storing section of a vehicle, and uses stored electricity for family use or for industrial use in the high electricity charge time therein; therefore, it is supposed that the vehicle purchaser calculates the earning, assuming such a case.

A purchaser (user) of a vehicle retrieves/reads "ABC" that is a model of the vehicle that the purchaser plans to purchase, from a vehicle identification information displaying portion by an information reading/selecting portion, using the text retrieval function of the information reading/selecting portion, whereby vehicle identification information such as ABC as model, ABC01 as type, ABC001 as vehicle type, 20 km/kWh as fuel efficiency, 15,000 yen as weight tax, 15,000 yen as acquisition tax, 13 kWh as vehicle electricity storage amount, and 14 hours/100V (14 hours at 100V) as vehicle electricity storage amount charging time, is read/selected and displayed on a displaying portion. Here, ABC01 as type, ABC001 as vehicle type, 20 km/kWh as fuel efficiency, 15,000 yen as weight tax, and 15,000 yen as acquisition tax are displayed as reference information. The purchaser inputs 10 years using a purchaser planned vehicle owning year information displaying portion as purchaser planned vehicle owning year information that is planned by the purchaser, whereby said information is selected by the information reading/selecting portion, and is displayed on the displaying portion. The purchaser inputs 10 days/month using a purchaser planned vehicle non-using day information displaying portion as purchaser planned vehicle non-using day information, whereby said information is selected by the information reading/selecting portion, and is displayed on a displaying portion. The purchaser reads/selects, from an electricity charge system information displaying portion, 9 yen as low electricity charge and 28 yen as high electricity charge in the electricity charge system of the region where the purchaser lives, using the information reading/selecting portion, whereby said information is displayed on the displaying portion. The purchaser inputs, using the purchaser electricity consumption information displaying portion, 8 hours as low electricity charge time, 12 hours as high electricity charge time, 20 hours as purchaser total electricity using time and 18 kWh as purchaser total electricity consumption, whereby said information is selected by the information reading/selecting portion, and is displayed on the displaying portion. (Note that the 18 kWh as purchaser total electricity consumption is used here as a calculation element.) The purchaser inputs 8 hours (100V) as low electricity charge time information, 0 hour (100 V) as high electricity charge time information and 8 hour (100V) as electricity company chargeable time information, whereby said information is selected by the information reading/selecting portion, and is displayed on the displaying portion. The stored electric energy using/selling earning information calculating portion calculates, using the information, which is selected and displayed on the displaying portion, of 13 kWh as vehicle electricity storage amount, 14 hours (100V) as vehicle electricity storage amount charging time, and 8 hours (100V) as electricity company electricity chargeable time information, an electricity storage amount per day (where the electricity storage amount per day is less than or equal to the vehicle electricity storage amount, expressed in kWh, hereinafter referred to as "electric energy storage amount information"), with which the vehicle purchaser can charge and store electric energy from the electricity supply company into the electricity storing section of the vehicle of the vehicle purchaser, by the following equation: 13 (vehicle electricity storage amount)×8 (electricity company electricity chargeable time information)/(vehicle electricity storage amount charging time)≈7.43 (kWh), and said result is displayed on a displaying portion. The stored electric energy using/selling earning information calculating portion is configured in such a manner as to: determine, with respect to the abovementioned electric energy storage amount information, that electric energy storage amount information is less than or equal to purchaser electricity consumption information, in the determination (hereinafter referred to as "electric energy storage amount information determination") of whether the electric energy storage amount information is more than the purchaser electricity consumption information, or the electric energy storage amount information is less than or equal to the purchaser electricity consumption information, based on 7.43 as electric energy storage amount information and 18 kWh as purchaser total electricity consumption; and calculate, using the information, which is displayed on the abovementioned displaying portion, of 10 days/month as purchaser vehicle non-using day information, 10 years as purchaser planned vehicle owning year information, 9 yen as low electricity charge, 28 yen as high electricity charge, 8 hours (100V) as low electricity charge time information, 8 hours (100V) as high electricity charge time information, 8 hours (100V) as electricity company electricity chargeable time information, 0 hour (100V) as high electricity charge time information, and 7.43 kWh as electric energy storage amount information, stored electric energy using/selling earning information in the case where electric energy from an electricity supply company is charged and stored, and stored electric energy is used as electric energy for family use or for industrial use, by the following equation: [28 (high electricity charge)−{(9 (low electricity charge)×8 (low electricity charge time information)+28 (high electricity charge)×0 (high electricity charge time information (*2))/ 7.43 (electric energy storage amount information))}×7.43 (electric energy storage amount information (*1))×10 (purchaser vehicle non-using day information, in month)×12 (months)×10 (purchaser planned vehicle owning year information)≈163,248 (yen). Note that the term in parenthesis after the figure in the calculation above represents what said figure portion. Information to be taken in (*1) may be either electric energy storage amount information or purchaser total electricity consumption in the case where said pieces of information are the same. Purchaser total electricity consumption in taken in, in the case where electric energy storage amount information is more than purchaser total electricity consumption, and electric energy storage amount information is taken in, in the case where electric energy storage amount information is less than purchaser total electricity consumption. With respect to information to be taken in (*2), it is possible to maximize earning in calculating earning when electricity is charged and stored into the electricity storing section in low electricity charge time, and stored electricity is used as electricity for family use or for industrial use in high electricity charge time, so that 0 hour (100V) is preferable as charging time information in high electricity charge time. However, in the case where a purchaser selects information of 1 hour or more, for some reason, as the charging time information in high charge time, the earning is calculated by the abovementioned calculating formula.

In addition, in the case of calculating earning in said case, for example, when calculating earning (hereinafter referred to as "stored electricity using earning in low/high charge time") in the case where electricity charged and stored in the abovementioned electricity storing section is used for family use or for industrial use in low electricity charge time and in high electricity charge time in an electricity charge system, it is possible to calculate the stored electricity using earning in low/high charge time by configuring said invention so as to further comprise a stored electricity using low/high charge time displaying portion for memorizing or inputting a stored electricity using time in low electricity charge time, which is a time in which electricity stored in the electricity storing section of a vehicle is used in the low electricity charge time, and a stored electricity using time in high electricity charge time, which is a time in which electricity stored in the electricity storing section of a vehicle is used in the high electricity charge time. The method for calculating the stored electricity using earning in low/high charge time in that case is represented by ((high electric charge)× (stored electricity using time in high electricity charge time)+(low electric charge)×(stored electricity using time in low electricity charge time))/((stored electricity using time in high electricity charge time)+(stored electricity using time in low electricity charge time)−{((low electricity charge)× (electricity charging time information in low charge time)+ (high electricity charge)×(electricity charging time information in high charge time)/(electric energy storage amount information))}×(electric energy storage amount information)×(purchaser vehicle non-using day information, in month)×12 (months)×(purchaser planned vehicle owning year information).

Next, an example is disclosed, which explains how the stored electric energy using/selling earning information calculating portion calculates earning in the vehicle evaluation system of the eleventh invention of the preset application, in the abovementioned "case 2: earning is obtained by charging and storing electric energy from an electricity supply company into an electricity storing section of a vehicle and selling the stored electric energy to an electricity buying company". A purchaser (user) of a vehicle retrieves/reads "ABC" which is a vehicle model by an information reading/ selecting portion from a vehicle identification information displaying portion, using the text retrieval function of the information reading/selecting portion, whereby vehicle identification information such as ABC as model, ABC01 as type, ABC001 as vehicle type, 20 km/kWh as fuel efficiency, 15,000 yen as weight tax, 15,000 yen as acquisition tax, 13 kWh as vehicle electricity storage amount, and 14 hours/ 100V (14 hours at 100V) as vehicle electricity storage amount charging time, is read/selected and displayed on a displaying portion. The purchaser inputs 10 days/month using a purchaser planned vehicle non-using day information displaying portion as purchaser planned vehicle non-using day information, whereby said information is selected by the information reading/selecting portion, and is displayed on a displaying portion. The purchaser reads/selects, from the electricity charge system information displaying portion, 9 yen as low electricity charge and 28 yen as high electricity charge in the electricity charge system of the region where the purchaser lives, using the information reading/selecting portion, and said information is displayed on the displaying portion. The purchaser inputs 8 hours (100V) as low electricity charge time, 0 hour (100V) as high electricity charge time, and 8 hours as purchaser total electricity using time, using the electricity company electricity chargeable time information displaying portion, whereby said information is selected by the information reading/selecting portion, and is displayed on the displaying portion. The unit electricity buying price information is read/selected as 15 yen/kWh from the unit electricity buying price information displaying portion, using the information reading/selecting portion, and is displayed on the displaying portion. The stored electric energy using/selling earning information calculating portion calculates, using the information, which is selected and displayed on the displaying portion, of 13 kWh as vehicle electricity storage amount, 8 hours (100V) as vehicle electricity storage amount charging time, and 0 hour (100V) as electricity company electricity chargeable time information, an electricity storage amount per day (the electricity storage amount per day is less than or equal to vehicle electricity storage amount, expressed in kWh, hereinafter referred to as "electric energy storage amount information"), with which the vehicle purchaser can charge and store electric energy from the electricity company into the electricity storing section of the vehicle of the vehicle purchaser, by the following equation: 13 (vehicle electricity storage amount)×8 (electricity company electricity chargeable time information)/14 (vehicle electricity storage amount charging time)≈7.43 (kWh), and said result is displayed on a displaying portion. The stored electric energy using/selling earning information calculating portion is configured in such a manner as to calculate, using the information, which is displayed on the displaying portion, of 10 days/month as purchaser vehicle non-using day information, 10 years as purchaser planned vehicle owning year information, 9 yen as low electricity charge, 28 yen as high electricity charge, 8 hours (100V) as low electricity charge time information, 0 hour (100V) as high electricity charge time information, 15 yen/kWh as unit electricity buying price information, and 7.43 kWh as electric energy storage amount information, a stored electric energy using/selling earning information in the case where electric energy from an electricity company is charged and stored, and stored electric energy is sold to an electricity buying company, by the following equation: [15 (unit electricity buying price information)−{(9 (low electricity charge)×8 (low electricity charge time information)+28 (high electricity charge)×0 (high electricity charge time information)/7.43 (electric energy storage amount information))}×7.43 (electric energy storage amount information)×10 (purchaser vehicle non-using day information, in month)×12 (months)×10 (purchaser planned vehicle owning year information)≈47,340 (yen).

Next, an example is disclosed, which explains how the stored electric energy using/selling earning information calculating portion calculates earning in the vehicle evaluation system of the eleventh invention of the preset application, in the abovementioned "case 3: earning is obtained by charging and storing electric energy from an external electricity storage apparatus into an electricity storing section of a vehicle and using stored electric energy as electric energy for family use or for industrial use". A purchaser (user) of a vehicle retrieves/reads "ABC", which is a model of the vehicle that the purchaser plans to purchase, from a vehicle identification information displaying portion by an information reading/selecting portion, using the text retrieval function of the information reading/selecting portion, whereby vehicle identification information, such as ABC as model, ABC01 as type, ABC001 as vehicle type, 20 km/kWh as fuel efficiency, 15,000 yen as weight tax, 15,000 yen as acquisition tax, 13 kWh as vehicle electricity storage amount, and 14 hours/100V (14 hours at 100V) as vehicle electricity storage amount charging time, is read/selected, and is displayed on a displaying portion. The purchaser inputs 10 days/month using a purchaser planned vehicle non-using day information displaying portion as purchaser planned vehicle non-using day information that is planned by the purchaser, whereby said information is selected by the information reading/selecting portion, and is displayed on the displaying portion. The purchaser reads/selects, from an electricity charge system information displaying portion, 9 yen as low electricity charge and 28 yen as high electricity charge in the electricity charge system of the region where the purchaser lives, using the information reading/selecting portion, whereby said information is displayed on the displaying portion. The purchaser inputs, using a purchaser electricity consumption information displaying portion, 8 hours as low electricity charge time, 2 kWh as low charge electricity consumption, 10 hours as high electricity charge using time, 11 kWh as high charge electricity consumption, 18 hours as purchaser total electricity using time, and 13 kWh as purchaser total electricity consumption, whereby said information is selected by the information reading/selecting portion, and is displayed on the displaying portion. The purchaser inputs, using an electricity supply apparatus chargeable time information displaying portion, 8 hours (100V) as electricity supply apparatus chargeable time information, and selects said information using the information reading/selecting portion, whereby said information is displayed on the displaying portion. The abovementioned stored electric energy using/selling earning information calculating portion calculates, using the information, which is selected and displayed on the displaying portion, of 13 kWh as vehicle electricity storage amount, 14 hours (100V) as vehicle electricity storage amount charging time, and 8 hours (100V) as electricity supply apparatus chargeable time information, an electricity storage amount per day (where the electricity storage amount per day is less than or equal to the vehicle electricity storage amount, expressed in kWh, hereinafter referred to as "electric energy storage amount information"), with which the vehicle purchaser can charge and store electric energy from the electricity supply company into the electricity storing section of the vehicle of the vehicle purchaser, by the following equation: 13 (vehicle electricity storage amount)×8 (electricity company electricity chargeable time information)/14 (vehicle electricity storage amount charging time)≈7.43 (kWh), whereby said result is displayed on a displaying portion. The stored electric energy using/selling earning information calculating portion is configured in such a manner as to determine, with respect to electric energy storage amount information, whether electric energy storage amount information is less than or equal to high charge electricity consumption, or electric energy storage amount information is more than high charge electricity consumption, based on approximately 7.43 as electric energy storage amount information and 11 kWh as high charge electricity consumption, and determine that electric energy storage amount information is less than or equal to high charge electricity consumption. The stored electric energy using/selling earning information calculating portion is configured in such a manner that: in the case where it is determined that electric energy storage amount information is less than or equal to purchaser electricity consumption information, all the electric energy storage amount information is used as an alternative to high charge electricity using time; and in the case where electric energy storage amount information is more than high charge electricity consumption, electric energy storage amount information is firstly used as an alternative to high charge electricity using time, and then remaining electric energy storage information is used as an alternative to low charge electricity using time. The stored electric energy using/selling earning information calculating portion is also configured in such a manner as to calculate, using the information, which is displayed on the abovementioned displaying portion, of 10 days/month as purchaser vehicle non-using day information, 10 years as purchaser planned vehicle owning year information, 28 yen as high electricity charge, and 7.43 kWh as electric energy storage amount information, stored electric energy using/selling earning information in the case where electric energy from an electricity supply apparatus is charged and stored, and stored electric energy is used as electric energy for family use or for industrial use (as an alternative to high charge electricity using time), by the following equation: 28 (high electricity charge)×7.43 (electric energy storage amount information)×10 (purchaser vehicle non-using day information, in month)×12 (months)× 10 (purchaser planned vehicle owning year information)= 249,648 (yen). Note that, in said case, more specifically, when calculating earning (hereinafter referred to as "stored electricity using earning in low/high charge time") in the case where electricity charged and stored in the abovementioned electricity storing section is used for family use or for industrial use in the low electricity charge time and in the high electricity charge time in an electricity charge system, it is possible to calculate said earning by applying an idea similar to the idea mentioned above.

Next, an example is disclosed, which explains how the stored electric energy using/selling earning information calculating portion calculates earning in the vehicle evaluation system by the eleventh invention of the present application, in "case 4: earning is obtained by charging and storing electric energy from an external electricity storage apparatus and selling stored electric energy to an electricity buying company". A purchaser (user) of a vehicle retrieves/reads "ABC", which is a model of the vehicle that the purchaser plans to purchase, from a vehicle identification information displaying portion by an information reading/selecting portion, using the text retrieval function of the information reading/selecting portion, whereby vehicle identification information, such as ABC as model, ABC01 as type, ABC001 as vehicle type, 20 km/kWh as fuel efficiency, 15,000 yen as weight tax, 15,000 yen as acquisition tax, 13 kWh as vehicle electricity storage amount, and 14 hours/100V (14 hours at 100V) as vehicle electricity storage amount charging time, is read/selected and displayed on a displaying portion. The purchaser inputs 10 days/month using a purchaser planned vehicle non-using day information displaying portion as purchaser planned vehicle non-using day information, whereby said information is selected by the information reading/selecting portion, and is displayed on a displaying portion. The purchaser inputs, using an electricity supply apparatus chargeable time information displaying portion, 8 hours (100V) as electricity supply apparatus chargeable time information, whereby said information is selected by the information reading/selecting portion, and is displayed on the displaying portion. Unit electricity buying price information is read/selected as 40 yen/kWh from a unit electricity buying price information displaying portion by an information reading/selecting portion, and is displayed on the displaying portion. The stored electric energy using/selling earning information calculating portion is configured in such a manner as to calculate, using the information, which is selected and displayed on the displaying portion, of 13 kWh as the vehicle electricity storage amount, 14 hours (100V) as the vehicle electricity storage amount charging time, and 8 hours (100V) as electricity company electricity chargeable time information, an electricity storage amount per day (where the electricity storage amount per day is less than or equal to the vehicle electricity storage amount, expressed in kWh, hereinafter referred to as "electric energy storage amount information"), with which the vehicle purchaser can charge and store electric energy from the electricity supply company into the electricity storing section of the vehicle of the vehicle purchaser, by the following equation: 13 (vehicle electricity storage amount)×8 (electricity company electricity chargeable time information)/(vehicle electricity storage amount charging time)≈7.43 (kWh), and said result is displayed on the displaying portion. The stored electric energy using/selling earning information calculating portion calculates, using the information, which is displayed on the displaying portion, of 10 days/month as purchaser vehicle non-using day information, 10 years as purchaser planned vehicle owning year information, 7.43 kWh as electric energy storage amount information, and 40 yen/kWh as unit electricity buying price information, stored electric energy using/selling earning information in the case where electric energy from an electricity supply apparatus is charged and stored, and stored electric energy is sold to an electricity buying company, by the following equation: 40 (unit electricity buying price information)×7.43 (electric energy storage amount information)×10 (purchaser vehicle non-using day information, in month)×12 (months)×10 (purchaser planned vehicle owning year information)=356,640 (yen).

According to the methods for calculating earning in cases 1-4, it is possible to calculate the earning in the abovementioned "case 5: earning is obtained by charging and storing electric energy from an electricity supply company and an external electricity storage apparatus into an electricity storing section of a vehicle and using stored electric energy as electric energy for family use or for industrial use", and in "case 6: earning is obtained by charging and storing electric energy from an electricity supply company and an external electricity storage apparatus into an electricity storing section of a vehicle and selling stored electric energy to an electricity buying company", in combination with the methods for calculating earning in cases 1-4.

INDUSTRIAL APPLICABILITY

The present invention enables comparison/evaluation of the cost effectiveness of a vehicle by comparing mainly vehicle price, fuel efficiency, and energy consumption cost with those of other vehicles, promotes cost competition, function improvement, quality improvements and the like among vehicle manufactures, and, as a result, makes a contribution on creation of low carbon society, and benefit of purchasers. In addition, the present invention also provides, in a new way, comparison of a vehicle that a purchaser plans to purchase, which comprises an electricity storing section capable of being charged as needed, with other vehicles, wherein the earning that the purchaser of the vehicle obtains by using the electricity storing section in an application other than running the vehicle is predicted and calculated.

Furthermore, the present invention can be used for evaluating electric/electronic apparatuses other than evaluating cost effectiveness of a vehicle. In other words, the research and development of electric/electronic apparatuses has been active for the creation of low carbon society, as well as vehicles, and it becomes important to compare how the cost used for the research and development is reflected to the price thereof, with how energy consumption is improved thereby as a result.

Electricity consumption (W) is indicated on an electric/electronic apparatus, with which it is possible to calculate electricity charge in a planned using time of each electric/electronic apparatus. Consequently, it is possible to calculate evaluation of the cost effectiveness of an electric/electronic apparatus, based on electricity charge in a planned using time of each electric/electronic apparatus, and a planned using period.

For example, in the case where the price of a candidate refrigerator for purchasing is 100,000 yen, the electricity consumption thereof is 100 W, the electricity charge at a certain time in a certain area is 20 yen/kWh (average of daytime electricity charge and nighttime electricity charge), and said refrigerator is used for three years (1095 days), it is possible to provide an evaluation numerical value of (0.1 (kW)×1,095 (days)×24 (hours)×20 (yen/kWh)+100,000 (yen))/1,095 (days)=139.3 (yen/day).

What is claimed is:

1. A vehicle evaluation apparatus for providing a vehicle evaluation index to a terminal device connected to the vehicle evaluating apparatus through a network, comprising:
   a hardware computing device, and
   a non-transitory computer readable medium containing program instructions, execution of which by the hardware computing device causes the vehicle evaluation apparatus to perform steps of:
      receiving, from the terminal device through the network, identification information of a vehicle to be evaluated and a planned running distance of the vehicle;
      reading, from the medium, a purchase cost and a unit energy consumption cost per unit running distance of the vehicle that correspond to the identification information;
      calculating a running energy consumption cost in a case that the vehicle runs the planned running distance based on the unit energy consumption cost per unit running distance and the planned running distance of the vehicle that correspond to the identification information;
      calculating a first vehicle evaluation index by dividing a sum of the purchase cost and the running energy consumption cost by the planned running distance; and
      transmitting the first vehicle evaluation index to the terminal device through the network so that the terminal device displays the first vehicle evaluation index.

2. A vehicle evaluation apparatus according to claim 1, wherein the execution of the program instructions by the hardware computing device causes the vehicle evaluation apparatus to further perform steps of calculating a planned vehicle reselling price of the vehicle based on the planned running distance and the identification information of the vehicle, and
   wherein the calculating the first vehicle evaluation index is performed by dividing an amount obtained by subtracting the vehicle reselling price from the sum of the purchase cost and the running energy consumption cost by the planned running distance.

3. A vehicle evaluation apparatus according to claim 1, wherein the execution of the program instructions by the hardware computing device causes the vehicle evaluation apparatus to further perform steps of:
   calculating a second vehicle evaluation index by dividing the purchase cost by a fuel distance of the vehicle that corresponds to the identification information, and
   transmitting the second vehicle evaluation index to the terminal device through the network so that the terminal device displays the second vehicle evaluation index.

4. A vehicle evaluation apparatus according to claim 1, wherein the execution of the program instructions by the hardware computing device causes the vehicle evaluation apparatus to further perform steps of:
   calculating a third vehicle evaluation index by multiplying a numerical value obtained by dividing the planned running distance by the fuel distance of the vehicle corresponding to the identification information by a carbon dioxide emission coefficient that is a ratio between a unit calorific power and a carbon content; and
   transmitting the third vehicle evaluation index to the terminal device through the network so that the terminal device displays the third vehicle evaluation index.

5. A vehicle evaluation apparatus according to claim 1, the execution of the program instructions by the hardware computing device causes the vehicle evaluation apparatus to further perform steps of:
   receiving a number of planned years of owning the vehicle and an inputted planned vehicle non-using day information of the vehicle that shows a number of days in which the vehicle is not planned to be used for running;
   reading, from the medium, a unit electricity charge that shows an electricity charge per hour, and an electricity storage amount per day in an electricity storage equipped in the vehicle that corresponds to the identification information;
   calculating an earning of using/selling electricity obtained by storing electricity in the vehicle based on a difference between the electricity charge for storing an amount of electricity per day that is calculated based on the unit electricity charge and the earning that is obtained by at least one of using and selling of electricity that corresponds to the electricity storage amount per day, the planned vehicle owning year information, and the planned vehicle non-using day information; and
   calculating a using/selling electricity vehicle evaluation index by dividing a numerical value obtained by subtracting the earning of using/selling electricity from the purchase cost by the planned running distance; and
   transmitting the using/selling electricity vehicle evaluation index and the earning of using/selling electricity to the terminal device through the network so that the terminal device displays the earning of using/selling electricity, and the using/selling electricity vehicle evaluation index.

6. A vehicle evaluation apparatus for providing a vehicle evaluation index to a terminal device connected to the vehicle evaluating apparatus through a network, comprising:
   a computing device, and
   a non-transitory computer readable medium containing program instructions, execution of which by the hardware computing device causes the vehicle evaluating apparatus to perform steps of:
      receiving, from the terminal device through the network, identification information of a vehicle to be evaluated, planned vehicle owning year information of the vehicle, and planned vehicle non-using day information of the vehicle;
      reading, from the medium, a unit electricity charge that shows an electricity charge per hour, and an electricity storage amount per day in an electricity storage of the vehicle that corresponds to the identification information;
      calculating an electricity charge for storing an amount of electricity per day, as a per-day electricity charge for storing electricity, from the unit electricity charge;
      calculating an earning of using/selling electricity obtained by storing electricity in the vehicle based on
         a difference between the per-day electricity charge for storing electricity and the earning that is obtained by at least one of using and selling of electricity that corresponds to the electricity storage amount per day,
the planned vehicle owning year information, and the planned vehicle non-using day information; and
calculating a using/selling electricity vehicle evaluation index based on the earning of using/selling electricity; and
transmitting the using/selling electricity vehicle evaluation index to the terminal device through the network so that the terminal device displays the using/selling electricity vehicle evaluation index.

7. A vehicle evaluation apparatus according to claim 6, wherein the execution of the program instructions by the hardware computing device causes the vehicle evaluation apparatus to further perform steps of receiving, from the terminal device through the network, a high electricity charge and a low electricity charge that have different values, and
wherein the calculating the per-day electricity charge for storing electricity is performed using an electricity usage time of the high electricity charge and an electricity usage time of the low electricity charge.

8. A vehicle evaluation apparatus according to claim 6, wherein the execution of the program instructions by the hardware computing device causes the vehicle evaluation apparatus to further perform steps of:
receiving, from the terminal device through the network, a first chargeable time when the electricity storage can be charged by using first electricity supplied from an electricity supply company, and a second chargeable time when the electricity storage can be recharged by using second electricity provided by an electricity supply apparatus; and
calculating the electricity storage amount per day in the electricity storage equipped in the vehicle based on the first chargeable time and the second chargeable time.

9. A vehicle evaluation apparatus according to claim 6, wherein the execution of the program instructions by the hardware computing device causes the vehicle evaluation apparatus to further perform steps of reading, from the medium, a unit electricity buying price at which an electricity buying company purchases a unit amount of electricity, and
wherein the calculating the earning of using/selling electricity is performed using the electricity storage amount per day and the unit electricity buying price.

10. A vehicle evaluation apparatus according to claim 6, wherein the calculating the earning of using/selling electricity is performed using the electricity charge corresponding to the amount of electricity when the electricity stored in the electricity storage is used instead of purchasing the electricity to be used for family or industry from an electricity supply company.

11. A vehicle evaluation system for providing a vehicle evaluation index, comprising:
a terminal device including a display to provide the vehicle evaluation index to a user; and a vehicle evaluation apparatus that is connected to the terminal device through a network,
wherein the vehicle evaluation apparatus includes:
a computing device, and
a non-transitory computer readable medium containing program instructions, execution of which by the hardware computing device causes the vehicle evaluating apparatus to perform steps of:
receiving, from the terminal device through the network identification information of a vehicle to be evaluated and a planned running distance of the vehicle;
reading, from the medium, a purchase cost and a unit energy consumption cost per unit running distance of the vehicle that correspond to the identification information;
calculating a running energy consumption cost in a case that the vehicle runs the planned running distance based on the unit energy consumption cost per unit running distance and the planned running distance of the vehicle;
calculating a first vehicle evaluation index through dividing a sum of the purchase cost of the vehicle and the running energy consumption cost of the vehicle by the planned running distance; and
transmitting the first vehicle evaluation index to the terminal device through the network so that the terminal device displays the first vehicle evaluation index on the display.

12. A vehicle evaluation system according to claim 11, wherein the execution of the program instructions by the hardware computing device causes the vehicle evaluation apparatus to further perform steps of calculating a vehicle reselling price of the vehicle based on the planned running distance and the identification information of the vehicle, and
wherein the calculating the first vehicle evaluation index is performed by dividing a cost obtained by subtracting the vehicle reselling price from the sum of the purchase cost and the running energy consumption cost by the planned running distance.

13. A vehicle evaluation system according to claim 11, wherein the execution of the program instructions by the hardware computing device causes the vehicle evaluation apparatus to further perform steps of:
receiving, from the terminal device through the network, planned vehicle owning year information of the vehicle, and
planned vehicle non-using day information of the vehicle that shows a number of days in which the vehicle is not planned to be used;
reading, from the medium,
unit electricity charge that shows an electricity charge per unit hour, and
an electricity storage amount per day in an electricity storage of the vehicle;
calculating an earning of using/selling electricity obtained by storing electricity in the vehicle base on
a difference between a per-day electricity charge for storing an amount of electricity per day that is calculated based on the unit electricity charge, and the earning that is obtained by at least one of using and selling of electricity that corresponds to the electricity storage amount per day,
the planned vehicle owning year information, and the planned vehicle non-using day information;
calculating a using/selling electricity vehicle evaluation index by dividing a numerical value obtained by subtracting the earning of using/ selling electricity from the sum of the purchase cost and the running energy consumption cost by the planned running distance; and
transmitting at least one of the earning of using/selling electricity, and the using/selling electricity vehicle evaluation index to the terminal device through the network so that the-terminal device displays at least one of the earning of using/selling electricity, and the using/selling electricity vehicle evaluation index on the display.

14. A vehicle evaluation system, comprising:
a terminal device including a display to provide the vehicle evaluation index; and
a vehicle evaluation apparatus that is connected to the terminal device through a network,
wherein the vehicle evaluation apparatus includes:
  a computing device, and
  a non-transitory computer readable medium containing program instructions, execution of which by the hardware computing device causes the vehicle evaluating apparatus to perform steps of:
    receiving, from the first apparatus through the network,
      identification information of a vehicle to be evaluated,
      planned vehicle owning year information of the vehicle,
      planned vehicle non-using day information that shows a number of days in which the vehicle is not planned to be used;
    reading, from the medium, a unit electricity charge that shows an electricity charge per hour, and an electricity storage amount per day to an electricity storage equipped in the vehicle that correspond to the identification information;
    calculating an earning of using/selling electricity obtained by storing electricity in the vehicle based on
      a difference between a day electricity charge for storing an amount of electricity per day that is calculated based on the unit electricity charge and the earning that is obtained by at least one of using and selling electricity that corresponds to the electricity storage amount per day,
      the planned vehicle owning year information, and
      the planned vehicle non-using day information;
    calculating a using/selling vehicle evaluation index based on the earning of using/selling electricity; and
    transmitting-the using/selling vehicle evaluation index to the terminal device through the network so that the terminal device displays the using/selling vehicle evaluation index on the display.

15. A vehicle evaluation apparatus according to claim 1, wherein the execution of the program instructions by the hardware computing device causes the vehicle evaluation apparatus to further perform steps of:
  receiving information that includes
    a planned running distance per day in which the vehicle is planned to run per day,
    a number of weekly used days that shows a number of days in which the vehicle is planned to be used per week, and
    a number of planned years that the user is plaining to own the vehicle; and
  calculating a planned vehicle reselling price of the vehicle, using the information including the planned running distance per day, the number of weekly used days, and the number of planned years, and
  wherein the calculating the first vehicle evaluation index is performed by-dividing an amount obtained by subtracting the planned vehicle reselling price from the sum of the purchase cost and the running energy consumption cost by the planned running distance.

16. A vehicle evaluation apparatus for providing a vehicle evaluation index to a terminal device connected to the vehicle evaluating apparatus through a network, comprising:
  a hardware computing device, and
  a non-transitory computer readable medium containing program instructions, execution of which by the hardware computing device causes the vehicle evaluation apparatus to perform steps of:
    receiving, from the terminal device through the network,
      identification information of a vehicle to be evaluate,
      a planned running distance of the vehicle,
      a number of planned years of owning the vehicle;
      a planned vehicle non-using day information of the vehicle that shows a number of days in which the vehicle is not planned to be used for running;
    reading, from the medium, a purchase cost of the vehicle that corresponds to the identification information, a unit energy consumption cost per unit running distance of the vehicle that correspond to the identification information, a unit electricity charge that shows an electricity charge per hour, and an electricity storage amount per day in an electricity storage equipped in the vehicle that corresponds to the identification information;
    calculating a running energy consumption cost in a case that the vehicle runs the planned running distance based on the unit energy consumption cost per unit running distance and the planned running distance of the vehicle that correspond to the identification information;
    calculating a first vehicle evaluation index by dividing a sum of the purchase cost and the running energy consumption cost by the planned running distance;
    calculating an earning of using/selling electricity obtained by storing electricity in the vehicle using
      a difference between a day electricity charge for storing an amount of electricity per day that is calculated based on the unit electricity charge and the earning that is obtained by at least one of using and selling of electricity that corresponds to the electricity storage amount per day,
      the planned vehicle owning year information, and
      the planned vehicle non-using day information;
    calculating a using/selling electricity vehicle evaluation index by dividing a numerical value obtained by subtracting the earning of using/selling electricity from the purchase cost by the planned running distance; and
    transmitting a calculation result including at least one of the first vehicle evaluation index, the using/selling electricity vehicle evaluation index, and the earning of using/selling electricity to the terminal device through the network so that the terminal device displays the calculation result on the display.

* * * * *